(12) United States Patent
Wei et al.

(10) Patent No.: US 11,334,596 B2
(45) Date of Patent: May 17, 2022

(54) SELECTIVELY IDENTIFYING AND RECOMMENDING DIGITAL CONTENT ITEMS FOR SYNCHRONIZATION

(71) Applicant: Dropbox, Inc., San Francisco, CA (US)

(72) Inventors: Ermo Wei, Centreville, VA (US); Jialiang Li, San Francisco, CA (US); Kaiyue Sun, San Francisco, CA (US); Li Chen Koh, San Francisco, CA (US); Mingye Xia, San Francisco, CA (US); Yu Zhang, San Jose, CA (US); Yuyang Guo, Mountain View, CA (US)

(73) Assignee: Dropbox, Inc., San Francisco, CA (US)

( * ) Notice: Subject to any disclaimer, the term of this patent is extended or adjusted under 35 U.S.C. 154(b) by 382 days.

(21) Appl. No.: 15/964,267

(22) Filed: Apr. 27, 2018

(65) Prior Publication Data
US 2019/0332710 A1 Oct. 31, 2019

(51) Int. Cl.
*G06F 16/27* (2019.01)
*G06F 3/0482* (2013.01)
*H04L 67/306* (2022.01)

(52) U.S. Cl.
CPC ............ *G06F 16/27* (2019.01); *G06F 3/0482* (2013.01); *H04L 67/306* (2013.01)

(58) Field of Classification Search
CPC ............ G06F 16/178; G06F 16/24575; G06F 16/24578; G06F 16/27; G06F 16/219; G06F 3/04842; G06F 16/48; G06F 16/683; H04L 67/306
See application file for complete search history.

(56) References Cited

U.S. PATENT DOCUMENTS

| | | | |
|---|---|---|---|
| 5,165,031 A | 11/1992 | Pruul et al. |
| 5,452,448 A | 9/1995 | Sakuraba et al. |
| 5,862,346 A | 1/1999 | Kley et al. |
| 6,052,735 A | 4/2000 | Ulrich et al. |
| 6,125,369 A | 9/2000 | Wu et al. |
| 6,256,634 B1 | 7/2001 | Moshaiov et al. |
| 6,260,040 B1 | 7/2001 | Kauffman et al. |
| 6,272,545 B1 | 8/2001 | Flanagin et al. |
| 6,348,932 B1 | 2/2002 | Nishikawa et al. |

(Continued)

OTHER PUBLICATIONS

Deshpande, Mukund & Karypis, George. (Jan. 2004). Item-based top—N recommendation algorithms. ACM Transactions on Information Systems, pp. 143-177.

(Continued)

*Primary Examiner* — Yuk Ting Choi
(74) *Attorney, Agent, or Firm* — Keller Preece PLLC

(57) ABSTRACT

One or more embodiments of a synchronization system facilitate selectivity synchronizing digital content items from a collection of digital content items to a local storage of a client device. In particular, one or more embodiments described herein collect and analyze recall data for users of a digital content management system with respect to digital content items to determine synchronization scores for the digital content items. One or more embodiments described herein further include selectively identifying a subset of the digital content items based on the synchronization scores to recommend for synchronization to a local storage of a client device.

20 Claims, 10 Drawing Sheets

(56) References Cited

U.S. PATENT DOCUMENTS

| | | |
|---|---|---|
| 6,407,750 B1 | 6/2002 | Gioscia et al. |
| 6,467,034 B1 * | 10/2002 | Yanaka .............. G06F 11/2069 |
| | | 711/161 |
| 6,496,979 B1 | 12/2002 | Chen et al. |
| 6,636,873 B1 | 10/2003 | Carini et al. |
| 6,636,888 B1 | 10/2003 | Bookspan et al. |
| 6,725,281 B1 | 4/2004 | Zintel et al. |
| 6,795,688 B1 | 9/2004 | Plasson et al. |
| 6,904,185 B1 | 6/2005 | Wilkins et al. |
| 6,938,076 B2 | 8/2005 | Meyer et al. |
| 7,039,723 B2 | 5/2006 | Hu et al. |
| 7,103,357 B2 | 9/2006 | Kirani et al. |
| 7,139,555 B2 | 11/2006 | Apfel |
| 7,143,194 B1 | 11/2006 | Curley et al. |
| 7,162,454 B1 | 1/2007 | Donner et al. |
| 7,228,352 B1 | 6/2007 | Yaguchi et al. |
| 7,263,712 B2 | 8/2007 | Spencer |
| 7,317,699 B2 | 1/2008 | Godfrey et al. |
| 7,319,536 B1 | 1/2008 | Wilkins et al. |
| 7,321,919 B2 | 1/2008 | Jacobs et al. |
| 7,369,161 B2 | 5/2008 | Easwar et al. |
| 7,372,485 B1 | 5/2008 | Bodnar et al. |
| 7,421,458 B1 | 9/2008 | Taylor et al. |
| 7,441,180 B1 | 10/2008 | Kaczmarek et al. |
| 7,502,795 B1 | 3/2009 | Svendsen et al. |
| 7,576,752 B1 | 8/2009 | Benson et al. |
| 7,644,124 B1 | 1/2010 | Porter |
| 7,680,067 B2 | 3/2010 | Prasad et al. |
| 7,707,500 B2 | 4/2010 | Martinez |
| 7,747,596 B2 | 6/2010 | Bigioi et al. |
| 7,773,106 B2 | 8/2010 | Serdy, Jr. et al. |
| 7,774,326 B2 | 8/2010 | Arrouye et al. |
| 7,809,682 B2 | 10/2010 | Paterson et al. |
| 7,873,353 B2 | 1/2011 | Kloba et al. |
| 7,885,925 B1 | 2/2011 | Strong et al. |
| 7,917,628 B2 | 3/2011 | Hesselink et al. |
| 7,930,270 B2 | 4/2011 | Tsang |
| 7,962,137 B2 | 6/2011 | Coppinger et al. |
| 7,962,622 B2 | 6/2011 | Friend et al. |
| 8,001,088 B2 | 8/2011 | Tawa, Jr. |
| 8,019,900 B1 | 9/2011 | Sekar et al. |
| 8,230,026 B2 | 7/2012 | Gilhuly et al. |
| 8,321,374 B2 | 11/2012 | Holt et al. |
| 8,341,345 B2 | 12/2012 | Tulskie et al. |
| 8,370,298 B2 | 2/2013 | Strong et al. |
| 8,600,934 B2 | 12/2013 | Strong et al. |
| 8,612,439 B2 | 12/2013 | Prahlad et al. |
| 8,620,861 B1 | 12/2013 | Uhrhane et al. |
| 8,650,498 B1 | 2/2014 | Mihovilovic |
| 8,965,847 B1 | 2/2015 | Chang |
| 9,037,540 B2 | 5/2015 | Strong et al. |
| 9,131,054 B2 | 9/2015 | Vendrow et al. |
| 9,501,762 B2 | 11/2016 | Babenko et al. |
| 9,817,878 B2 | 11/2017 | Newhouse |
| 10,057,318 B1 | 8/2018 | Rashid et al. |
| 10,158,708 B2 | 12/2018 | Strong et al. |
| 10,320,904 B2 | 6/2019 | Strong et al. |
| 2002/0013852 A1 | 1/2002 | Janik |
| 2002/0044159 A1 | 4/2002 | Kuroiwa et al. |
| 2002/0059604 A1 | 5/2002 | Papagan et al. |
| 2002/0065848 A1 | 5/2002 | Walker et al. |
| 2002/0066050 A1 | 5/2002 | Lerman et al. |
| 2002/0099772 A1 | 7/2002 | Deshpande et al. |
| 2002/0129096 A1 | 9/2002 | Mansour et al. |
| 2002/0184264 A1 | 12/2002 | Berg et al. |
| 2002/0198858 A1 | 12/2002 | Stanley et al. |
| 2003/0004952 A1 | 1/2003 | Nixon et al. |
| 2003/0014478 A1 | 1/2003 | Noble |
| 2003/0037114 A1 | 2/2003 | Nishio et al. |
| 2003/0041094 A1 | 2/2003 | Lara et al. |
| 2003/0055825 A1 | 3/2003 | Chen et al. |
| 2003/0058277 A1 | 3/2003 | Bowman-Amuah |
| 2003/0074418 A1 | 4/2003 | Coker |
| 2003/0097361 A1 | 5/2003 | Huang et al. |
| 2003/0131098 A1 | 7/2003 | Huntington et al. |
| 2003/0154187 A1 | 8/2003 | Hayakawa et al. |
| 2003/0159136 A1 | 8/2003 | Huang et al. |
| 2003/0172127 A1 | 9/2003 | Northrup et al. |
| 2003/0217181 A1 | 11/2003 | Kiiskinen |
| 2003/0218633 A1 | 11/2003 | Mikhail et al. |
| 2004/0024979 A1 | 2/2004 | Kaminsky et al. |
| 2004/0044732 A1 | 3/2004 | Fushiki et al. |
| 2004/0044799 A1 | 3/2004 | Sivaraman et al. |
| 2004/0054736 A1 | 3/2004 | Daniell et al. |
| 2004/0068524 A1 | 4/2004 | Aboulhosn et al. |
| 2004/0088420 A1 | 5/2004 | Allen et al. |
| 2004/0107236 A1 | 6/2004 | Nakagawa et al. |
| 2004/0123048 A1 | 6/2004 | Mullins et al. |
| 2004/0126750 A1 | 7/2004 | Theilmann et al. |
| 2004/0143598 A1 | 7/2004 | Drucker et al. |
| 2004/0148207 A1 | 7/2004 | Smith et al. |
| 2004/0148375 A1 | 7/2004 | Levett et al. |
| 2004/0172423 A1 | 9/2004 | Kaasten et al. |
| 2004/0177319 A1 | 9/2004 | Horn et al. |
| 2004/0267905 A1 | 12/2004 | McDonough et al. |
| 2004/0268364 A1 | 12/2004 | Faraj |
| 2005/0015441 A1 | 1/2005 | Attwood et al. |
| 2005/0038863 A1 | 2/2005 | Onyon et al. |
| 2005/0044164 A1 | 2/2005 | O'Farrell et al. |
| 2005/0044165 A1 | 2/2005 | O'Farrell et al. |
| 2005/0050479 A1 | 3/2005 | Bogdan et al. |
| 2005/0091595 A1 | 4/2005 | Shappell et al. |
| 2005/0149481 A1 | 7/2005 | Hesselink et al. |
| 2005/0149508 A1 | 7/2005 | Deshpande et al. |
| 2005/0165869 A1 | 7/2005 | Huang et al. |
| 2005/0193361 A1 | 9/2005 | Vitanov et al. |
| 2005/0198015 A1 | 9/2005 | Sezan et al. |
| 2005/0208803 A1 | 9/2005 | Rohatgi et al. |
| 2005/0223061 A1 | 10/2005 | Auerbach et al. |
| 2005/0246373 A1 | 11/2005 | Faulkner et al. |
| 2005/0246374 A1 | 11/2005 | Blinn et al. |
| 2005/0248374 A1 | 11/2005 | Kushnick |
| 2005/0262166 A1 | 11/2005 | Rajeev et al. |
| 2005/0278458 A1 | 12/2005 | Berger et al. |
| 2006/0018444 A1 | 1/2006 | Pantana et al. |
| 2006/0052091 A1 | 3/2006 | Onyon et al. |
| 2006/0069809 A1 | 3/2006 | Serlet |
| 2006/0085429 A1 | 4/2006 | Wener et al. |
| 2006/0101053 A1 | 5/2006 | Proctor et al. |
| 2006/0101064 A1 | 5/2006 | Strong et al. |
| 2006/0123010 A1 | 6/2006 | Landry et al. |
| 2006/0156239 A1 | 7/2006 | Jobs et al. |
| 2006/0168000 A1 | 7/2006 | Bodlaender et al. |
| 2006/0170669 A1 | 8/2006 | Walker et al. |
| 2006/0184673 A1 | 8/2006 | Liebman |
| 2006/0198015 A1 | 9/2006 | Engler et al. |
| 2006/0242206 A1 | 10/2006 | Brezak et al. |
| 2006/0259957 A1 | 11/2006 | Tam et al. |
| 2007/0005581 A1 | 1/2007 | Arrouye et al. |
| 2007/0005707 A1 | 1/2007 | Teodosiu et al. |
| 2007/0016586 A1 | 1/2007 | Samji et al. |
| 2007/0016695 A1 | 1/2007 | Rabbers et al. |
| 2007/0043830 A1 | 2/2007 | Housenbold et al. |
| 2007/0078938 A1 | 4/2007 | Hu et al. |
| 2007/0156434 A1 | 7/2007 | Martin et al. |
| 2007/0179989 A1 | 8/2007 | Maes |
| 2007/0180075 A1 | 8/2007 | Chasman et al. |
| 2007/0180084 A1 | 8/2007 | Mohanty et al. |
| 2007/0198473 A1 | 8/2007 | Carrier et al. |
| 2007/0209005 A1 | 9/2007 | Shaver et al. |
| 2007/0239898 A1 | 10/2007 | Friend et al. |
| 2007/0250645 A1 | 10/2007 | Meadows et al. |
| 2007/0276836 A1 | 11/2007 | Chatterjee et al. |
| 2007/0288614 A1 | 12/2007 | May et al. |
| 2007/0294366 A1 | 12/2007 | Ozzie et al. |
| 2008/0109448 A1 | 5/2008 | Aboel-Nil et al. |
| 2008/0126936 A1 | 5/2008 | Williams |
| 2008/0140732 A1 | 6/2008 | Wilson et al. |
| 2008/0168185 A1 | 7/2008 | Robbin et al. |
| 2008/0184125 A1 | 7/2008 | Suleiman et al. |
| 2008/0189627 A1 | 8/2008 | Nikitin et al. |
| 2008/0195729 A1 | 8/2008 | Chand et al. |
| 2008/0195739 A1 | 8/2008 | Ozzie et al. |
| 2008/0208870 A1 | 8/2008 | Tsang |

(56) References Cited

U.S. PATENT DOCUMENTS

| | | |
|---|---|---|
| 2008/0208998 A1 | 8/2008 | Warren et al. |
| 2008/0250083 A1 | 10/2008 | Kovacs et al. |
| 2008/0307504 A1 | 12/2008 | Cisler et al. |
| 2009/0024931 A1 | 1/2009 | Bae |
| 2009/0064284 A1 | 3/2009 | Poston et al. |
| 2009/0094252 A1 | 4/2009 | Wong et al. |
| 2009/0183060 A1 | 7/2009 | Heller et al. |
| 2009/0187609 A1 | 7/2009 | Barton et al. |
| 2009/0192976 A1 | 7/2009 | Spivack et al. |
| 2009/0300020 A1 | 12/2009 | Chen et al. |
| 2009/0327900 A1 | 12/2009 | Noll et al. |
| 2010/0063670 A1 | 3/2010 | Brzezinski et al. |
| 2010/0115614 A1 | 5/2010 | Barile et al. |
| 2010/0205196 A1 | 8/2010 | Schreiber et al. |
| 2010/0241980 A1 | 9/2010 | Sosnosky et al. |
| 2010/0332682 A1 | 12/2010 | Sharp et al. |
| 2011/0010332 A1 | 1/2011 | Vasudevan et al. |
| 2011/0106880 A1 | 5/2011 | Strong et al. |
| 2012/0016915 A1 | 1/2012 | Choi et al. |
| 2012/0084355 A1 | 4/2012 | Locker et al. |
| 2012/0096389 A1 | 4/2012 | Flam et al. |
| 2012/0102410 A1* | 4/2012 | Gewecke .............. G06F 16/435 715/738 |
| 2012/0127156 A1 | 5/2012 | Goossens et al. |
| 2012/0197862 A1 | 8/2012 | Woytowitz et al. |
| 2012/0330887 A1 | 12/2012 | Young et al. |
| 2013/0007207 A1 | 1/2013 | Dietrich et al. |
| 2013/0066975 A1 | 3/2013 | Kantor et al. |
| 2013/0067594 A1 | 3/2013 | Kantor et al. |
| 2013/0091550 A1 | 4/2013 | Joyce et al. |
| 2013/0110903 A1 | 5/2013 | Myerscough et al. |
| 2013/0117423 A1 | 5/2013 | Gupta et al. |
| 2013/0191451 A1 | 7/2013 | Tse et al. |
| 2013/0198868 A1 | 8/2013 | Georgiev |
| 2013/0205251 A1 | 8/2013 | Cisler et al. |
| 2013/0212486 A1 | 8/2013 | Joshi et al. |
| 2013/0232187 A1 | 9/2013 | Workman et al. |
| 2013/0246610 A1 | 9/2013 | Hirano |
| 2013/0275509 A1 | 10/2013 | Micucci et al. |
| 2013/0282830 A1 | 10/2013 | Besen et al. |
| 2013/0305039 A1 | 11/2013 | Gauda et al. |
| 2013/0311598 A1 | 11/2013 | Arrouye et al. |
| 2013/0311986 A1 | 11/2013 | Arrouye et al. |
| 2013/0318582 A1 | 11/2013 | McCann et al. |
| 2014/0095457 A1 | 4/2014 | Quan |
| 2014/0181016 A1 | 6/2014 | Whitehead et al. |
| 2014/0188868 A1* | 7/2014 | Hunter .................... G06F 3/067 707/736 |
| 2014/0317031 A1* | 10/2014 | Babenko .............. G06Q 10/101 706/12 |
| 2015/0213101 A1 | 7/2015 | Strong et al. |
| 2015/0264115 A1 | 9/2015 | Reilly et al. |
| 2015/0358406 A1* | 12/2015 | Scheer .................... G06F 11/30 709/248 |
| 2016/0026704 A1 | 1/2016 | Strong et al. |
| 2016/0028809 A1 | 1/2016 | Strong et al. |
| 2016/0028810 A1 | 1/2016 | Strong et al. |
| 2016/0028811 A1 | 1/2016 | Rashid et al. |
| 2016/0028812 A1 | 1/2016 | Strong et al. |
| 2016/0028813 A1 | 1/2016 | Strong et al. |
| 2016/0028814 A1 | 1/2016 | Strong et al. |
| 2016/0028815 A1 | 1/2016 | Strong et al. |
| 2016/0028852 A1 | 1/2016 | Strong et al. |
| 2016/0055171 A1 | 2/2016 | Araki et al. |
| 2017/0017352 A1* | 1/2017 | Kanter .................. G06F 3/0485 707/999.003 |
| 2017/0093780 A1* | 3/2017 | Lieb ......................... G06T 3/40 |
| 2018/0278684 A1 | 9/2018 | Rashid et al. |

OTHER PUBLICATIONS

10605—Instructors, Distributed SGD for Matrix Factorization on Spark, Nov. 12, 2015, pp. 1-11, 10-605—HW 5, Carnegie Mellon University, Pittsburgh, PA.

Final Office Action from U.S. Appl. No. 16/397,945, dated Sep. 29, 2020, 20 pages.
Notice of Allowance from U.S. Appl. No. 15/992,342, dated Aug. 27, 2020, 5 pages.
Advisory Action from U.S. Appl. No. 14/873,004, dated May 19, 2020, 3 pages.
Advisory Action from U.S. Appl. No. 15/992,342, dated May 19, 2020, 3 pages.
Final Office Action from U.S. Appl. No. 14/873,004, dated Feb. 12, 2020, 18 pages.
Final Office Action from U.S. Appl. No. 15/992,342, dated Feb. 25, 2020, 19 pages.
Jmans25, "Map/Mount Dropbox as a Network Drive," Oct. 14, 2011, Youtube, 1 page.
Non-Final Office Action from U.S. Appl. No. 14/873,187, dated Jan. 10, 2020, 17 pages.
Non-Final Office Action from U.S. Appl. No. 16/397,945, dated Jul. 23, 2020, 18 pages.
Notice of Allowance from U.S. Appl. No. 14/873,004, dated Aug. 12, 2020, 6 pages.
Notice of Allowance from U.S. Appl. No. 14/873,004, dated Jun. 12, 2020, 11 pages.
Notice of Allowance from U.S. Appl. No. 14/873,187, dated Jul. 30, 2020, 8 pages.
Notice of Allowance from U.S. Appl. No. 14/873,187, dated Jun. 24, 2020, 13 pages.
Notice of Allowance from U.S. Appl. No. 15/992,342, dated Jun. 15, 2020, 10 pages.
Notice of Allowance for U.S. Appl. No. 12/157,772 dated Oct. 6, 2010, 15 pages.
Notice of Allowance for U.S. Appl. No. 12/928,998 dated Oct. 9, 2012, 13 pages.
Notice of Allowance for U.S. Appl. No. 13/571,512 dated Apr. 6, 2018, 17 pages.
Notice of Allowance for U.S. Appl. No. 13/757,024 dated Jul. 25, 2013, 11 pages.
Notice of Allowance for U.S. Appl. No. 13/757,024 dated Oct. 30, 2013, 7 pages.
Notice of Allowance for U.S. Appl. No. 14/075,598 dated Jan. 14, 2015, 10 pages.
Notice of Allowance for U.S. Appl. No. 14/683,341 dated Jun. 25, 2018, 10 pages.
Notice of Allowance for U.S. Appl. No. 14/873,199 dated Jan. 25, 2019, 16 pages.
Notice Of Allowance for U.S. Appl. No. 14/873,197 dated Aug. 29, 2019, 14 pages.
Office Action for U.S. Appl. No. 14/873,187 dated Apr. 24, 2019, 21 pages.
Office Action for U.S. Appl. No. 11/269,498 dated Aug. 22, 2007, 18 pages.
Office Action for U.S. Appl. No. 11/269,498 dated Mar. 25, 2008, 17 pages.
Office Action for U.S. Appl. No. 11/269,498 dated Mar. 7, 2007, 14 pages.
Office Action for U.S. Appl. No. 12/928,998 dated Apr. 22, 2011, 26 pages.
Office Action for U.S. Appl. No. 12/928,998 dated Nov. 23, 2011, 24 pages.
Office Action for U.S. Appl. No. 13/571,512 dated Apr. 23, 2015, 23 pages.
Office Action for U.S. Appl. No. 13/571,512 dated Feb. 24, 2014, 17 pages.
Office Action for U.S. Appl. No. 13/571,512 dated Jun. 13, 2014, 22 pages.
Office Action for U.S. Appl. No. 13/571,512 dated May 19, 2016, 21 pages.
Office Action for U.S. Appl. No. 13/571,512 dated Oct. 20, 2016, 27 pages.
Office Action for U.S. Appl. No. 13/571,512 dated Oct. 26, 2017, 28 pages.
Office Action for U.S. Appl. No. 13/571,512 dated Sep. 23, 2014, 25 pages.

(56) References Cited

OTHER PUBLICATIONS

Office Action for U.S. Appl. No. 14/683,341 dated Nov. 16, 2017, 14 pages.
Office Action for U.S. Appl. No. 14/872,004 dated Jan. 18, 2018, 8 pages.
Office Action for U.S. Appl. No. 14/872,004 dated Mar. 28, 2019, 19 pages.
Office Action for U.S. Appl. No. 14/872,004 dated Sep. 6, 2018, 11 pages.
Office Action for U.S. Appl. No. 14/872,019 dated Aug. 29, 2018, 13 pages.
Office Action for U.S. Appl. No. 14/872,019 dated Feb. 26, 2019, 15 pages.
Office Action for U.S. Appl. No. 14/872,019 dated Nov. 16, 2017, 14 pages.
Office Action for U.S. Appl. No. 14/872,943 dated Jul. 11, 2018, 12 pages.
Office Action for U.S. Appl. No. 14/872,943 dated Oct. 4, 2017, 13 pages.
Office Action for U.S. Appl. No. 14/872,943 dated Dec. 19, 2018, 19 pages.
Office Action for U.S. Appl. No. 14/873,004 dated Aug. 10, 2018, 19 pages.
Office Action for U.S. Appl. No. 14/873,004 dated Feb. 9, 2018, 28 pages.
Office Action for U.S. Appl. No. 14/873,004 dated Jul. 17, 2019, 17 pages.
Office Action for U.S. Appl. No. 14/873,004 dated Nov. 23, 2018, 34 pages.
Office Action for U.S. Appl. No. 14/873,004 dated Oct. 26, 2017, 26 pages.
Office Action for U.S. Appl. No. 14/873,186 dated Mar. 22, 2018, 24 pages.
Office Action for U.S. Appl. No. 14/873,186 dated Dec. 13, 2018, 33 pages.
Office Action for U.S. Appl. No. 14/873,187 dated Apr. 17, 2018, 15 pages.
Office Action for U.S. Appl. No. 14/873,187 dated Dec. 10, 2018, 18 pages.
Office Action for U.S. Appl. No. 14/873,195 dated Apr. 19, 2018, 14 pages.
Office Action for U.S. Appl. No. 14/873,197 dated Jul. 11, 2018, 13 pages.
Office Action for U.S. Appl. No. 14/873,197 dated Jun. 3, 2019, 20 pages.
Office Action for U.S. Appl. No. 14/873,197 dated Oct. 5, 2017, 13 pages.
Office Action for U.S. Appl. No. 14/873,197 dated Dec. 14, 2018, 16 pages.
Office Action for U.S. Appl. No. 14/873,199 dated Jun. 1, 2018, 16 pages.
Office Action for U.S. Appl. No. 15/992,342 dated Jul. 31, 2019, 29 pages.
Office Action for U.S. Appl. No. 14/872,943 dated Jun. 17, 2019, 19 pages.
Rhee E., "How to Map a Drive Letter to Google Drive in Windows," May 3, 2012, Retrieved from https://www.cnet.com/how-to/how-to-Map-a-Drive-Letter-to-Google-Drive-in-Windows/ on Oct. 7, 2016, pp. 1-2.
Non-Final Office Action from U.S. Appl. No. 16/508,059, dated Apr. 2, 2021, 14 pages.
Notice of Allowance for U.S. Appl. No. 14/873,186 dated May 15, 2019, 32 pages.
Notice of Allowance for U.S. Appl. No. 14/873,195 dated Apr. 2, 2019, 15 pages.
Office Action for U.S. Appl. No. 14/872,019 dated Aug. 14, 2019, 14 pages.
Office Action for U.S. Appl. No. 14/873,195 dated Oct. 26, 2018, 14 pages.
Notice of Allowance from U.S. Appl. No. 16/397,945, dated Jan. 6, 2021, 11 pages.
Notice of Allowance from U.S. Appl. No. 16/397,945, dated Feb. 25, 2021, 2 pages.
Notice of Allowance from U.S. Appl. No. 16/991,446, dated Oct. 4, 2021, 10 pages.
Notice of Allowance from U.S. Appl. No. 16/508,059, dated Nov. 5, 2021, 17 pages.
Non-Final Office Action from U.S. Appl. No. 16/991,446, dated Jul. 8, 2021, 18 pages.

* cited by examiner

SELECTIVELY IDENTIFYING AND RECOMMENDING DIGITAL CONTENT ITEMS FOR SYNCHRONIZATION

BACKGROUND

Computing devices (e.g., computers, tablets, smart phones) provide numerous ways for people to capture, store, create, share, view, and manage digital content. For example, conventional remote storage systems enable client devices to utilize resources of one or more remote servers to store, share, and otherwise manage any number of digital content items while preserving local storage space of individual client devices. Indeed, rather than storing all photos, videos, documents, programs, and other files on a local hard drive of a client device, users can remotely store and access any number of files using remote storage space provided by conventional remote storage systems.

Storing and managing digital content via remote storage, however, suffers from a number of limitations and drawbacks. For example, where a client device has an unreliable or poor connection with a remote storage system, a user of the client device is often unable to download or access a copy of one or more important files. In addition, where a file is accessible to multiple users and one or more users have made changes to the file, other users experiencing connectivity issues may mistakenly access outdated versions of the file, causing miscommunications and frustration between the users attempting to view or access the most updated version of the file.

Many individuals overcome or anticipate intermittent or poor network conditions by selectively storing local copies of remote files and periodically synchronizing the local copies with corresponding remote files maintained via the remote storage space. However, where remote storage accounts include tens and hundreds of thousands of files and folders, storage limitations of client devices limit the number of local copies that can be readily accessible without a reliable connection to the remote storage space. In addition, in selecting which files to store locally, users often select too many local files, depleting storage space of the client device, thereby negatively impacting performance of the client device and largely negating any benefit provided by the remote storage system. Alternatively, users often select too few files to locally store, resulting in one or more important files being inaccessible under poor network conditions.

Accordingly, there are a number of considerations to be made in managing access to remote content items.

SUMMARY

Embodiments of the present disclosure provide benefits and/or solve one or more of the foregoing or other problems in the art with systems, methods, and computer-readable media for synchronizing local copies of digital content items with corresponding digital content items on a digital content management system. In particular, the disclosed systems provide local access to important digital content items by selectively identifying digital content items of interest to a user to maintain locally on the local storage of a client device without depleting unnecessary storage space of the client device. For example, in one or more embodiments, the disclosed systems generate synchronization scores for digital content items from a collection of digital content items accessible to the user and selectively synchronize and/or provide a recommendation to synchronize digital content items of interest to the user based on the associated synchronization scores. In one or more embodiments, the disclosed systems utilize one or multiple models for selectively identifying digital content items of particular interest to the user from the collection.

To elaborate, the systems disclosed herein can collect and analyze recall data including interactions by a user and a team of co-users with respect to digital content items from a collection of digital content items. The disclosed systems can analyze profiles of recalled digital content items as well as compare recall data of the user and a team of co-users using one or more analytical models. Based on the analysis of the digital content item profiles and recall data, the disclosed systems can identify digital content items of particular interest to the user. By selectively identifying digital content items of interest to a user, the disclosed systems can provide local access to important digital content items from a large collection of digital content items without depleting storage space of a client device having limited storage capabilities.

Moreover, the disclosed systems facilitate greater collaboration and communication between a team of users including the user and co-users without requiring a user to manually go through and select individual digital content items to synchronize to a local storage of the client device. For instance, by comparing user features, content features, and recall histories (e.g., a history of interactions with a collection of digital content items) of a user and associated co-users, the disclosed systems can identify digital content items to synchronize (or recommend synchronizing) for the user that will enable the user to more effectively collaborate and communicate with other co-users of the digital content management system.

Additional features and advantages of the present disclosure will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the present disclosure and are not therefore to be considered to be limiting of its scope, the present disclosure will be described and explained with additional specificity and detail through the use of the accompanying drawings.

DETAILED DESCRIPTION

Figure 1:
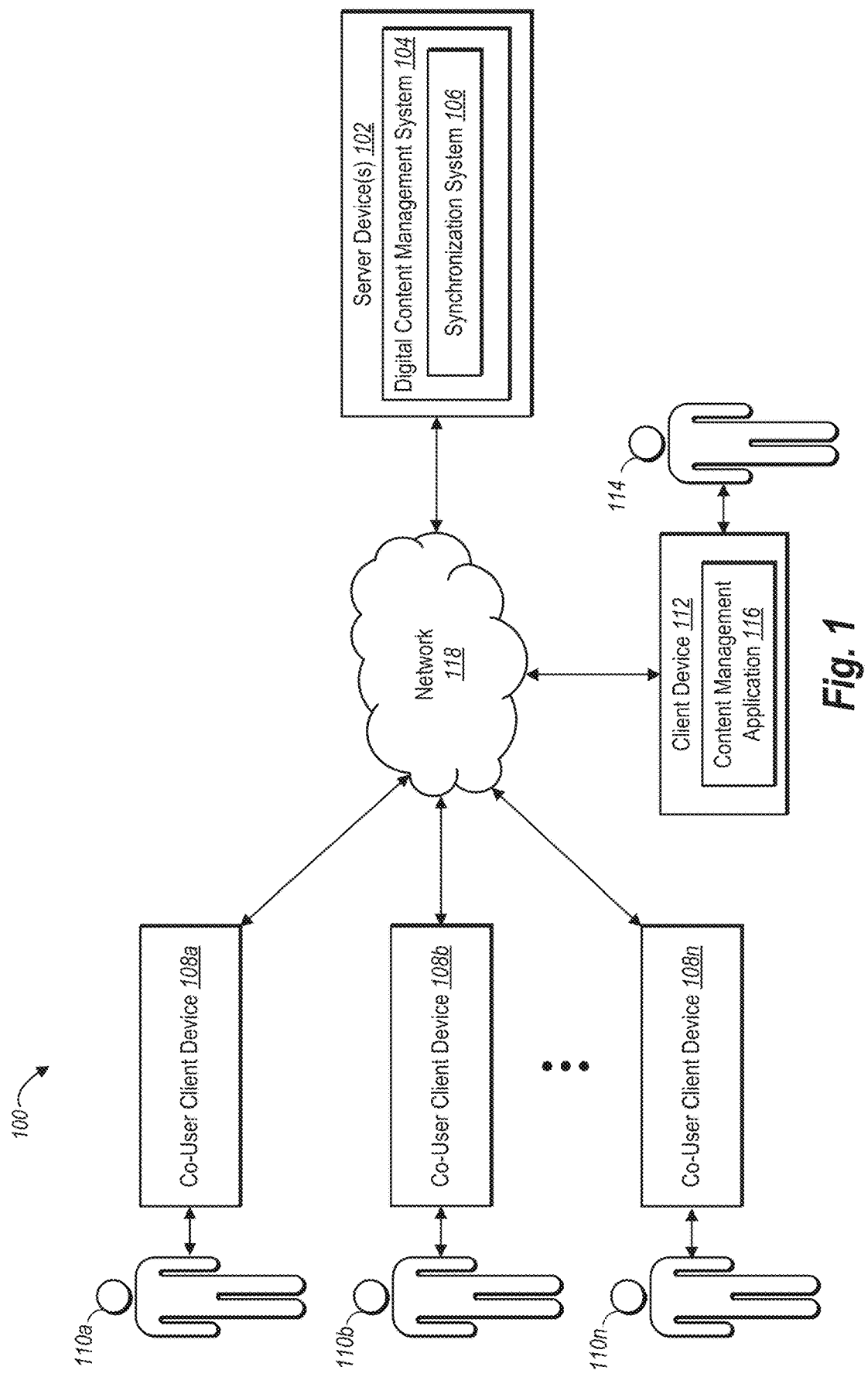
FIG. 1 illustrates a block diagram of an example environment for implementing a synchronization system in accordance with one or more embodiments.

The present disclosure provides one or more embodiments of a synchronization system that facilitates selectively synchronizing digital content items from a collection of digital content items to a local storage of a client device. In particular, the synchronization system collects and analyzes recall data for a user and associated co-users including a history of interactions with respect to the digital content items and corresponding file data. The synchronization system further determines a synchronization score for the digital content items of the collection of digital content items associated with a probability that the user will synchronize the digital content items to a local storage of the client device (or multiple client devices). Further, the synchronization system selectively synchronizes or provides a recommendation to synchronize one or more digital content items from the collection based on associated synchronization scores.

As mentioned above, the synchronization system collects recall data including information associated with recall of digital content items by a user of a digital content management system. For example, the synchronization system tracks which digital content items from a collection of digital content items recalled (e.g., accesses, downloads) by the user and identifies interactions by the user with respect to the recalled digital content items. In one or more embodiments, the synchronization system constructs a user profile including recall data associated with the user.

In addition to collecting information about the user, the synchronization system can similarly collect information about a team of users including co-users of the digital content management system. For example, the synchronization system can track which digital content items from the collection of digital content items each of the co-users recall in addition to identifying which of the digital content items the co-users have synchronized to local storage spaces. Similar to the user, the synchronization system can construct co-user profiles including recall data and synchronization data for the respective co-users.

The synchronization system can further analyze the collected recall data about the user and co-users to identify digital content items of interest to the user of the digital content management system. In particular, in one or more embodiments, the synchronization system analyzes the recall data including information about the user and co-users as well as information about the respective digital content items to determine a synchronization score indicative of whether the user will synchronize the digital content items to a local storage space of a client device. For example, in one or more embodiments, the synchronization system analyzes each of the digital content items from a collection of digital content items to identify digital content items having a similar profile or recall history as digital content items that have been synchronized by the user and/or co-users of the digital content management system.

As will be described in further detail below, the synchronization system can implement a variety of analysis models to determine synchronization scores for the respective digital content items. For example, in one or more embodiments, the synchronization system implements a content-based model that compares digital content item profiles to identify digital content items similar to those that have been synchronized by the user and/or co-users. As another example, in one or more embodiments, the synchronization system implements a correlation model that compares user profiles to determine synchronization patterns of co-users having a similar pattern of recall behavior as the user. Further, in one or more embodiments, the synchronization system utilizes a latent factor model that extrapolates data about any number of digital content items based on factors and features associated with the digital content items and co-users of the digital content management system who have recalled the digital content items.

In addition, as will be described in further detail below, the synchronization system can utilize a combination of different analysis models based on collected recall data about the user and/or team of users. For example, where a user has a limited recall history (e.g., a new user), the synchronization system can apply greater weight to a latent factor model or content-based model while applying less weight to a collaboration model. Alternatively, where a user has a more extensive recall history, the synchronization system can apply a greater weight to the collaboration model, where a user profile includes more information to compare with user profiles of co-users. Additional detail with regard to utilizing different models and combining analysis from respective models will be provided below.

Furthermore, upon determining synchronization scores for digital content items of the collection of digital content items, the synchronization system can synchronize and/or provide one or more recommendations to a user to synchronize one or more digital content items to a local storage space of a client device. For example, in one or more embodiments, the synchronization system identifies the digital content items having the highest synchronization scores and provides a recommendation to synchronize the identified digital content items. In addition, or as an alternative, in one or more embodiments, the synchronization system automatically synchronizes one or more digital content items to a local storage space of the client device based on the determined synchronization scores for the associated digital content items.

The synchronization system provides a number of advantages over conventional remote storage systems. For example, by selectively identifying those digital content items of particular interest to a user for synchronization, the synchronization system prevents downloading too many digital content items from a remotely stored collection and over-utilizing the local storage of individual client devices. Indeed, rather than automatically downloading all remotely stored files or any number of remotely stored files up to a storage capacity of the client device (largely negating many benefits provided by a remote storage), the synchronization system intelligently identifies digital content items of particular interest to locally store on the client device, while relying on the remote storage for other files. Accordingly, in contrast to conventional systems that over-utilize local storage space by downloading files that a specific user is unlikely to recall, the synchronization system improves functionality of client devices by selectively identifying digital content items for synchronization, resulting in efficient utilization of bandwidth and increasing available local storage space on the client devices.

In addition, by applying analysis models to determine a synchronization score that considers recall data from both the user and a team of co-users, the synchronization system facilitates effective collaboration and communication between the user and co-users of the synchronization system. For example, by considering a recall history including recall data of the user and recall data of co-users, the synchronization system considers a more extensive history of recall data to more accurately predict which of the digital content items would be of interest to the user. Further, by utilizing the recall history of any number of co-users, the synchronization system can effectively identify digital content items of interest even where a user has little or no recall history with respect to the collection of digital content items.

Furthermore, by utilizing multiple analysis models, the synchronization system customizes analysis of recall data based on features associated with the user, co-users, and individual digital content items. For example, where a user is a new user of the digital content management system, the synchronization system can place a greater emphasis on results of an analysis model structured to identify digital content items of interest for a user without an extensive recall history. Alternatively, where a user has an extensive recall history, the synchronization system can further consider or place a greater emphasis on one or more additional analysis models that consider the recall history of the user in identifying digital content items of interest for the user.

In addition, by determining synchronization scores and selectively identifying digital content items for synchronization in accordance with one or more embodiments described herein, the synchronization system facilitates intelligent selection of digital content items for synchronization without requiring intervention by a user of the client device. Indeed, by utilizing the analysis models described herein to determine digital content items for synchronization, the synchronization system can autonomously identify digital content items for synchronization without requiring a user to navigate a massive collection of digital content items to manually identify digital content items to synchronize. As a result, the synchronization system decreases user frustration as a result of large and disorganized collections of digital content items and/or miscommunications between a team of co-users.

As illustrated by the foregoing discussion, the present disclosure utilizes a variety of terms to describe features and advantages of a synchronization system. Additional detail is now provided regarding the meaning of some of these terms. For instance, as used herein, a "digital content item" or "digital content" can be any digital data such as documents, collaboration content items, text files, audio files, image files, video files, webpages, executable files, binaries, etc. A digital content item can include collections or other mechanisms for grouping digital content items together with different behaviors, such as folders, zip files, playlists, albums, etc. A collection of digital content items can refer to a folder or a plurality of digital content items that are related or grouped by a common attribute. For example, a collection of digital content items can refer to any number of digital content items accessible to a user of a digital content management system (e.g., via a user account of the digital content management system associated with the user).

As used herein, a "user" refers to an individual or other entity associated with a user account of the digital content management system that enables the user or co-users to access a collection of digital content items associated with the user account. For example, a user associated with a user account can store, view, download, or otherwise interact with digital content items via a remote storage space managed by the digital content management system. In addition, a user can provide access to one or more digital content items to co-users of the digital content management system. For example, a user can provide access to one or more digital content items associated with a user account to one or more co-users including individuals associated with respective co-user accounts and/or non-users of the digital content management system not otherwise associated with respective user-accounts.

As used herein, a "synchronization score" refers to a score determined for a user with respect to a digital content item from a collection of digital content items. In particular, a synchronization score associated with a digital content item refers to a likelihood or probability that a given user associated with a recall history with respect to digital content items from the collection of digital content items will request synchronization of the digital content item (e.g., provide a request to a digital content management system to synchronize the digital content item). Accordingly, a synchronization score refers to a prediction generated by a synchronization system that a user will eventually request synchronization of a digital content item to a local storage of a client device based on a recall history of the user and one or more co-users of the digital content management system with the digital content item and/or with other digital content items having similar features and/or characteristics. As will be described in further detail below, the synchronization system can utilize a number of different models and techniques to determine the synchronization score for a digital content item. In particular, in one or more embodiments, the synchronization system determines a synchronization score based on recall data associated with respective users and/or digital content items.

As used herein, "recall data" refers to information associated with digital content items from a collection of digital content items that a user and/or co-users of a digital content management system have accessed, synchronized, or otherwise interacted with using respective client devices and co-user client devices. In addition, recall data can refer to a number of actions (e.g., a history of actions) taken with respect to a digital content item. In one or more embodiments, a digital content item is "recalled" in a number of ways. For example, a recalled digital content item can refer to a digital content item that has been viewed, downloaded, interacted with, modified, synchronized, or otherwise been accessed by a user or co-users of the digital content management system.

In one or more embodiments described herein, recall data refers to recall data by one or more individuals. For example, "user-recall data" refers to information about one or more actions taken by a user of a client device with respect to a given digital content item. For instance, user-recall data can refer to a history of interactions with respect to any number of digital content items from a collection of digital content items. Similarly, "co-user recall data" refers to information about one or more co-users of the digital content management system with respect to any number of digital content items.

Additional detail will now be provided regarding the synchronization system in relation to illustrative figures portraying exemplary embodiments. For example, FIG. 1 illustrates a block diagram of an example environment 100 including synchronization system 106 for providing access to remotely stored digital content items via a digital content management system and selectively identifying digital content items to synchronize to a local storage space of a client device. An overview of synchronization system 106 is described in relation to FIG. 1. Thereafter, a more detailed description of the components and processes of synchronization system 106 is provided in relation to the subsequent figures.

As illustrated in FIG. 1, environment 100 includes server device(s) 102 including digital content management system 104 and synchronization system 106 thereon. As further shown, environment 100 includes co-user client devices 108a-n and corresponding co-users 110a-n. The example environment 100 further includes client device 112 including content associated with user 114 and including content management application 116. As further shown, each of server device(s) 102, co-user client devices 108a-n, and client device 112 can communicate over network 118. Network 118 may include one or more multiple networks and may use one or more communication platforms or technologies suitable for transmitting data. In one or more embodiments, network 118 includes the Internet or World Wide Web. In addition, or as an alternative, network 118 can include various other types of networks that use various communication technologies and protocols. Additional details related to network 118 are explained below in reference to FIG. 10.

Although FIG. 1 illustrates a particular number and arrangement of devices, it will be understood that environment 100 can include any number of devices, including any number of server devices 102, co-user client devices 108a-n, and/or client devices 112. Moreover, one or more of the devices may directly communicate with server device(s) 102 or via an alternative communication network, bypassing network 118.

In addition, the devices of environment 100 may refer to various types of computing devices. For example, one or more of the devices (e.g., server device(s) 102, co-user client devices 108a-n, client device 112) may include a mobile device such as a mobile telephone, a smartphone, a PDA, a tablet, or a laptop. Additionally, or alternatively, one or more of the devices may include a non-mobile device such as a desktop computer, a server, or another type of computing device. Additional detail with regard to different types of computing devices is described in reference to FIG. 9.

In addition, in one or more embodiments, content management application 116 refers to a software application associated with digital content management system 104. In one or more embodiments, content management application 116 provides and controls various features and functionality on client device 112 and enables user 114 to share and receive digital content items stored on digital content management system 104 (e.g., stored on a remote storage space hosted by digital content management system 104). In one or more embodiments, the content management application 116 refers to a native or hybrid application installed on a respective computing device. Alternatively, in one or more embodiments, content management application 116 refers to a web browser used to access digital content management system 104. In addition, while not shown in FIG. 1, some or all of co-user client devices 108a-n include a content management application similar to content management application 116 on client device 112.

As an overview, digital content management system 104 enables client device 112 and co-user client devices 108a-n associated with respective user 114 and co-users 110a-n to store digital content items on digital content management system 104. For example, client device 112 can upload a digital content item from client device 112 to digital content management system 104 over network 118. Client device 112 can further remotely access the uploaded digital content item over network 118 by downloading or remotely accessing the digital content item on digital content management system 104.

In addition, in one or more embodiments, user 114 can facilitate providing access to co-user client devices 108a-n of digital content management system 104 by requesting to share one or more digital content items on digital content management system 104 with one or more identified co-users 110a-n associated with user 114. For example, digital content management system 104 can share access to one or more digital content items with a team of users including co-users 110a-n and user 114. In one or more embodiments, digital content management system 104 shares access to one or more co-users 110a-n by providing access to the digital content items from a user account of user 114 via co-users accounts of the respective co-users 110a-n. Alternatively, in one or more embodiments, digital content management system 104 shares access to one or more co-users 110a-n including non-users of digital content management system 104 by providing one or more shared links that facilitate access to digital content items stored on digital content management system 104. Accordingly, digital content management system 104 can provide access to any user of digital content management system 104 with whom user 114 has shared access.

In one or more embodiments, digital content management system 104 provides selective access to digital content items on a user account. For instance, digital content management system 104 can provide access to a single file, folder of files, or multiple selected files and folders from a larger collection of digital content items on a user account associated with user 114. In addition, digital content management system 104 can share access to single files, folders, or multiple selected files and folders from collections of digital content items between co-users 110a-n and user 114.

In addition to generally storing, sharing, and otherwise facilitating access to digital content items maintained on digital content management system 104, in one or more embodiments, synchronization system 106 facilitates synchronization of digital content items of digital content items associated with user 114. In particular, as described here, synchronization system 106 can synchronize a digital content item on digital content management system 104 to a local storage space of client device 112. As used herein, "synchronizing" a digital content item refers to downloading a local copy of a digital content item to a client device corresponding to a copy of the digital content item on digital content management system 104. In addition, synchronizing a digital content item can refer to updating the local copy of the digital content item to correspond to a current copy of the digital content item on digital content management system 104. For example, synchronization system 106 can periodically update the local copy of the digital content item by replacing the local copy with an updated copy including any edits or modifications made by user 114 and/or one or more co-users 108a-n of digital content management system 104.

In addition, as will be described in further detail below, in one or more embodiments, synchronization system 106 identifies one or more digital content items (e.g., associated with a user account) of digital content items to synchronize for a respective user. For example, in one or more embodiments, synchronization system 106 selectively identifies digital content items of digital content items associated with user 114 to automatically synchronize or, alternatively, to recommend synchronizing to a local storage of client device 112. In particular, synchronization system 106 selectively identifies digital content items of interest to synchronize to the local storage of client device 112 based on a determined likelihood that user 114 would synchronize or later request access to the identified digital content items.

In one or more embodiments, synchronization system 106 determines a coefficient between user 114 and digital content items of a collection of digital content items based on an analysis of the recall data associated with user 114 and co-users 110a-n of digital content management system 104. In particular, in one or more embodiments, synchronization system 106 determines a synchronization score indicative of whether user 114 will synchronize or otherwise request access to a given digital content item based on recall data associated with the given digital content item. In particular, synchronization system 106 determines a synchronization score with respect to a digital content item indicating a likelihood that a given user having a similar recall history with respect digital content items of the collection of digital content items will synchronize the digital content item. Synchronization system 106 can determine the synchronization score based on a combination of user-recall data and co-user recall data.

In addition, synchronization system 106 can determine the synchronization score using a variety of methods and techniques. For instance, as will be described in further detail in connection with FIGS. 2-5, synchronization system 106 can analyze the recall data to determine synchronization scores based on one or a combination of analysis models including, by way of example, a content-based model, a collaboration model, and/or a latent factor model. Each of these analysis models will be described in further detail below.

Upon identifying synchronizations scores for each of the digital content items of a collection of digital content items, synchronization system 106 can further provide a notification or recommendation associated with synchronizing one or more digital content items of interest to user 114. For example, in one or more embodiments, synchronization system 106 automatically synchronizes one or more digital content items of interest to user 114. In addition, or as an alternative, in one or more embodiments, synchronization system 106 provides a recommendation to synchronize one or more digital content items of interest to user 114. In one or more embodiments, synchronization system 106 provides an indication of one or more digital content items for synchronization to client device 112 causing content management application 116 to provide notifications and/or recommendations associated with synchronizing digital content items to the local storage of client device 112 via a graphical user interface of client device 112.

Figure 2:
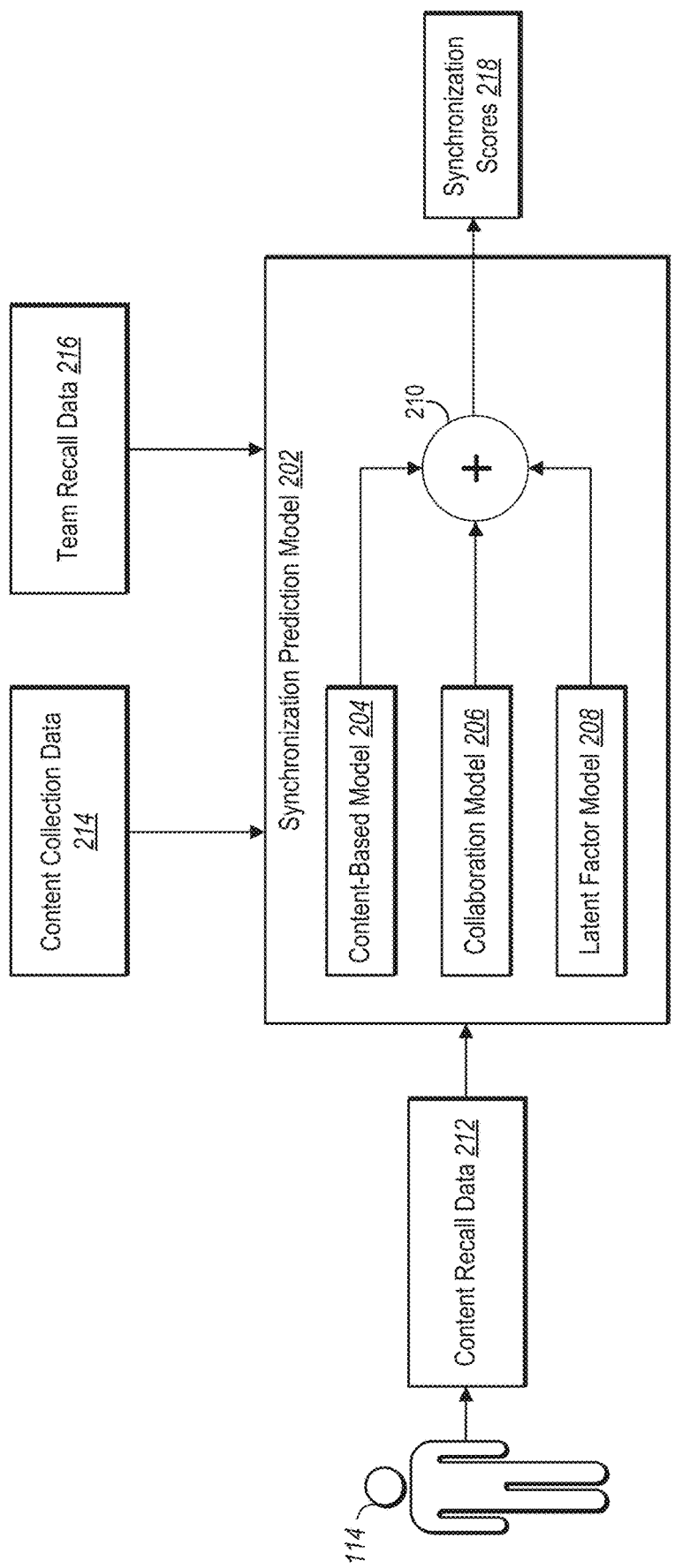
FIG. 2 illustrates an example synchronization prediction model utilized by the synchronization system in accordance with one or more embodiments.

Additional detail will now be given with respect to identifying digital content items of interest for synchronization in accordance with one or more embodiments. In particular, FIG. 2 illustrates an example embodiment in which synchronization system 106 analyzes recall data with respect to a collection of digital content items to selectively identify one or more digital content items to synchronize to the local storage of client device 112. In particular, as shown in FIG. 2, synchronization system 106 trains and/or utilizes synchronization prediction model 202 to determine synchronization scores 218 for digital content items of a collection associated with a likelihood that user 114 of client device 112 will synchronize and/or request access to the respective digital content items.

In particular, as shown in FIG. 2, synchronization system 106 utilizes synchronization prediction model 202 to determine synchronization scores 218 based on user recall data 212. In one or more embodiments, synchronization system 106 collects user recall data 212 by tracking interactions with respect to digital content items of a collection of digital content items. In particular, synchronization system 106 collects user recall data 212 including identified digital content items that have been recalled by user 114. In addition, synchronization system 106 tracks or otherwise collects interaction data with respect to the recalled digital content items.

In one or more embodiments, synchronization system 106 constructs a user profile for user 114 including recall data 212 associated with user 114. In particular, synchronization system 106 can build a user profile including interaction data with respect to any number of digital content items recalled by user 114. For example, the user profile can include an identification of recalled digital content items, a number of times that corresponding digital content items have been recalled by user 114, types of interactions (e.g., viewing, editing, downloading, synchronizing, etc.) performed with respect to digital content items, and other data associated with interactions by user 114 in connection with respective digital content items.

As further shown in FIG. 2, synchronization system 106 utilizes synchronization prediction model 202 to determine synchronization scores 218 based on co-user recall data 214. In particular, synchronization system 106 can collect co-user recall data 214 similar to user recall data 212 described above. In addition, synchronization system 106 can construct co-user profiles for co-users 110a-n of digital content management system 104 including co-user recall data 214. For example, similar to user recall data 212, synchronization system 106 can collect co-user recall data 212 including interaction data with respect to digital content items from the collection of digital content items recalled by user 114.

As shown in FIG. 2, synchronization system 106 further considers content collection data 216 when utilizing synchronization prediction model 202 to determine synchronization scores 218. In one or more embodiments, synchronization system 106 analyzes the collection of digital content items and builds, generates, or otherwise obtains content profiles for respective digital content items of the collection of digital content items. In one or more embodiments, synchronization system 106 generates a content profile for those digital content items that have been recalled by user 114 and/or co-users 110a-n. In addition, in one or more embodiments, synchronization system 106 generates a content profile for each digital content item from the collection including both digital content items that have been recalled by user 114 and co-users 110a-n and digital content items that have not been recalled by user 114 and/or co-users 110a-n.

As shown in FIG. 2, synchronization prediction model 202 receives user recall data 212, co-user recall data 214, and content collection data 216 to determine synchronization scores for respective digital content items from the collection. As further shown in FIG. 2, synchronization prediction model 202 includes multiple analysis models including, for example, content-based model 204, collaboration model 206, and latent factor model 208. In addition, synchronization prediction model 202 includes combiner function 210 that, in one or more embodiments, combines the outputs of the analysis models (e.g., models 204-208) to determine synchronization score based on analysis of user recall data 212, co-user recall data 214, and content collection data 216 using one or a combination of models 204-208.

As an overview, and as will be described in further detail in connection with FIG. 3, synchronization system 106 utilizes content-based model 204 to compare recalled digital content items between user 114 and co-users 110a-n. For example, in one or more embodiments, synchronization system 106 implements content-based model 204 by constructing content profiles for digital content items of the collection (e.g., based on content collection data 216). In addition, synchronization system 106 generates synchronization scores 218 based on a comparison between the content profiles associated with digital content items recalled by user 114 and content profiles associated with digital content items recalled by co-users 110a-n. Accordingly, synchronization system 106 utilizes a content-to-content comparison to determine a content score for respective digital content items from the collection of digital content items.

In addition, and as will be described in further detail in connection with FIG. 4, synchronization system 106 utilizes collaboration model 206 to compare recall histories between user 114 and co-users 110a-n. In particular, as described above, synchronization system 106 can construct user profiles for user 114 and co-users 110a-n based on recall data 212 and co-user recall data 214. In addition, synchronization system 106 can implement collaboration model 206 by comparing recall histories and identifying a subset of co-users 110a-n having a similar history of recalling digital content items and/or similar interactions with respect to the recalled digital content items. In one or more embodiments, synchronization system 106 compares user profiles between user 114 and co-users 110a-n to determine an output for respective digital content items based on similar recall histories between user 114 and co-users 110a-n. For example, in one or more embodiments, synchronization system 106 boosts or otherwise applies a positive weight to a synchronization score for a digital content item that has been recalled by both user 114 and co-users 110a-n having a similar user profile. Alternatively, in one or more embodiments, synchronization system 106 discards or otherwise applies a negative weight to digital content items recalled by co-users 110a-n having substantially different user profiles from user 114.

Moreover, as will be described in further detail in connection with FIG. 5, synchronization system 106 utilizes latent factor model 208 to compare factors of both content profiles and user profiles to extrapolate scores for individual digital content items from the collection of digital content items. For example, in one or more embodiments, synchronization system 106 identifies or determines scores for various recalled digital content items based on recall histories and/or associated content data. In addition, where one or more digital content items have no associated recall history and/or no known score, synchronization system 106 can utilize latent factor model 208 to extrapolate scores for both recalled digital content items as well as digital content items having no recall history.

For example, as will be described in further detail below in connection with FIG. 5, in one or more embodiments, synchronization system 106 generates a recall matrix including known scores corresponding to digital content items. In addition, synchronization system 106 can extrapolate one or more unknown scores from the recall matrix based on features of users and digital content items associated with the known scores.

In one or more embodiments, synchronization prediction model 202 further includes combiner function 210 to combine outputs from the analysis models 204-208 for the collection of digital content items to determine synchronization scores 218 for respective digital content items. For example, synchronization system 106 can determine a content score, collaboration score, and/or latent factor score for each digital content items from the collection of digital content items, combine the scores using the combiner function 210 and generate synchronization scores for respective digital content items from the collection of digital content items.

While one or more embodiments involve determining outputs for each of the analysis models 204-208 for each digital content item, in one or more embodiments, synchronization system 106 determines a subset of the three outputs based on available information with respect to the digital content items. For example, where a digital content item has been recently added to the collection and has no recall history, synchronization system 106 may determine a synchronization score based on an output of content-based model 204 and another output of latent factor model 208 without considering an output of collaboration model 206. As another example, where a user has recently registered an account with digital content management system 104 and has a limited recall history, synchronization system 106 can similarly consider a subset of relevant outputs to determine a corresponding synchronization score.

In one or more embodiments, synchronization system 106 applies weights to respective outputs of models 204-208 of synchronized prediction model 202. As an example, where a user has a limited recall history, synchronization system 106 (e.g., combiner function 210) can apply a greater weight to an output of content-based model 204 than an output of collaboration model 206. In addition, as the user interacts with the collection of digital content item creating a more extensive recall history, synchronization system 106 (e.g., combiner function 210) can apply a greater weight to an output of collaboration model 206 while decreasing the weight applied to the output of content-based model 204. In one or more embodiments, synchronization system 106 applies a linear model for decreasing the weight of the content-based model 204 while increasing the weight of the correlation based model 206 over time.

In one or more embodiments, synchronization prediction model 202 includes a machine learning model trained to output synchronization scores based on identified patterns of interactions with respect to sample digital content items and whether users associated with the interactions eventually synchronized the sample digital content items. For example, synchronization system 106 can analyze sample data including a history of sample user recall data, sample content collection data, and an indication of whether users associated with the sample recall data eventually synchronize corresponding digital content items.

For example, synchronization system 106 can train content-based model 204 by fine-tuning one or more algorithms for comparing features of digital content item and associated synchronization histories. In addition, synchronization system 106 can train collaboration model 206 by fine-tuning one or more algorithms for comparing user profiles and associated synchronization histories. Further, synchronization system 106 can utilize machine learning optimization to capture global and local correlations between user factors and digital content factors to train latent factor model 208 to determine synchronization probabilities for users and corresponding digital content items having corresponding recall data and content collection data. In addition, in one or more embodiments, synchronization system 106 can train combiner function 210 to fine-tune how to combine outputs from the respective analysis models 204-208 in determining synchronization scores 218 for respective digital content items.

Figure 3:
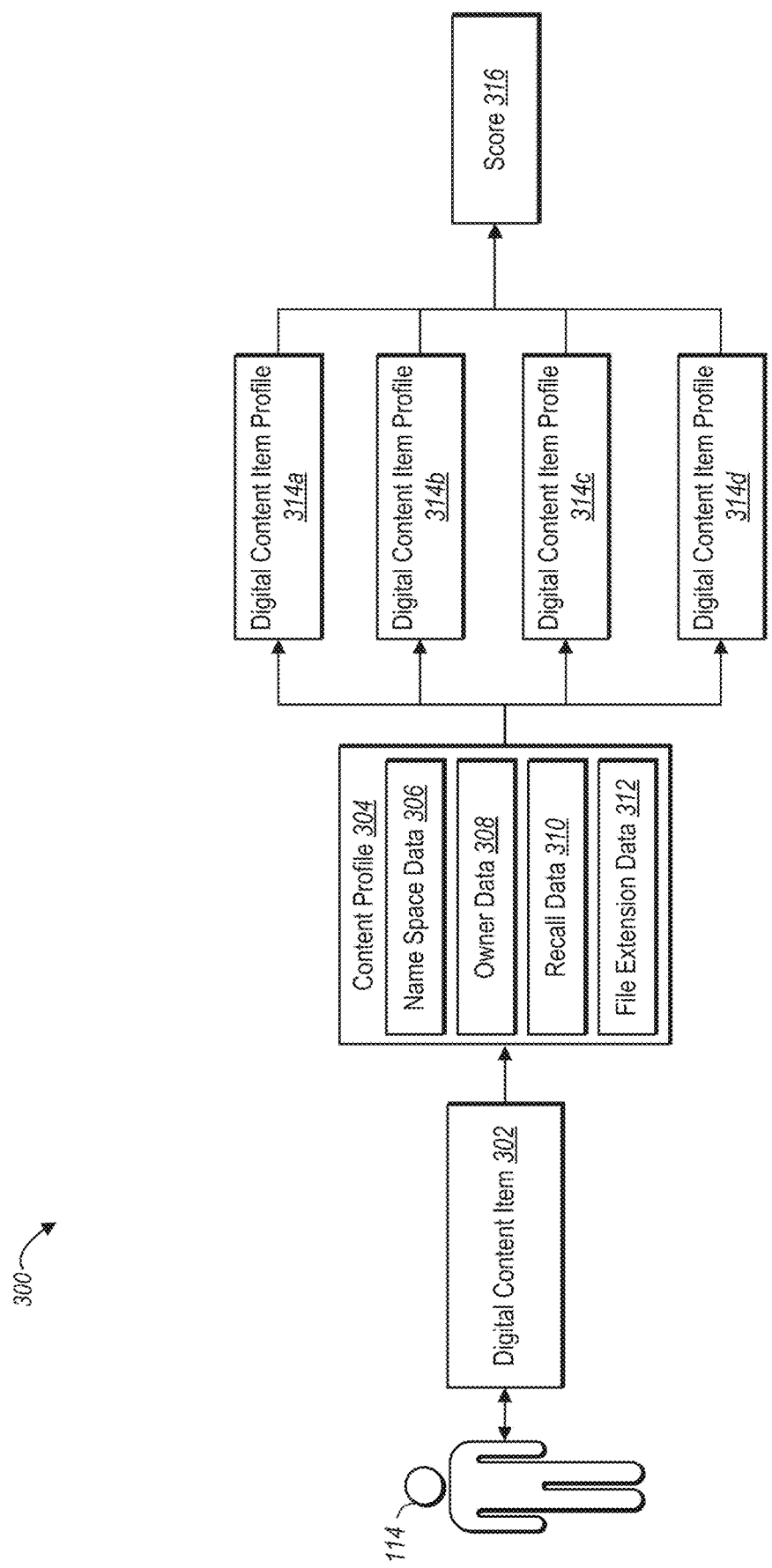
FIG. 3 illustrates an example implementation of a content-based model in accordance with one or more embodiments.

FIG. 3 illustrates an example workflow 300 for determining a content score for a digital content item. In one or more embodiments, synchronization system 106 can determine a content score for any number of digital content items from the collection of digital content items. FIG. 3 illustrates a workflow 300 for determining a content score (e.g., score 316) associated with an example digital content item (e.g., digital content item 302). In one or more embodiments, digital content item 302 refers to a recalled digital content item that user 114 has accessed, viewed, downloaded, or otherwise recalled. Alternatively, in one or more embodiments, digital content item 302 refers to a digital content item that user 114 has not recalled.

As further shown, synchronization system 106 generates content profile 304 for digital content item 302 including features associated with digital content item 302. In particular, as shown in FIG. 3, content profile 304 includes namespace data 306, owner data 308, recall data 310, and file extension data 312. By way of example, namespace data 306 can include information used to organize digital content item 302 on digital content management system 104 including identified file systems, devices, and networks. Owner data 308 can include information associated with a file creator or user who uploaded the file to digital content management system 104. Recall data 310 can include tracked instances of recall by user 114 and co-users 110a-n including timestamps associated with each recall. File extension 312 can refer to an identifier of a type of file (e.g., pdf, doc). In one or more embodiments, content profile 304 includes additional information associated with the digital content item 302.

As further shown by FIG. 3, synchronization system 106 determines content score 316 by comparing content profile 304 with digital content profiles of other digital content items from the collection of digital content items. In particular, synchronization system 106 compares features of content profile 304 (e.g., namespace data 306, owner data 308, recall data 310, file extension data 312) with corresponding features of other digital content items to determine score 316. For example, synchronization system 106 can compare content profile 304 to digital content item profiles 314a-d to identify one or more of digital content item profiles 314a-d from similar file folders, having similar owners, having a similar file extension, etc. In addition, synchronization system 106 can identify those digital content item profiles 314a-d having a high recall rate and/or that have been synchronized by a number of co-users 110a-n of digital content management system 104.

Based on the identified similarities and associated recall data, synchronization system 106 can determine score 316 based on the content-to-content comparison of content profile 304 and digital content item profiles 314a-d and associated recall data. For example, where content profile 304 and a corresponding digital content item profile have similar profiles and where the digital content item corresponding to a digital content item profile has been recalled frequently, synchronization system 106 can boost score 316 based on the identified similarities and recall frequency. Alternatively, where content profile 304 has a similar profile to a digital content item profile where the corresponding digital content item has been recalled infrequently (or has not been synchronized), synchronization system 106 can decrease score 316 for digital content item 302. As another example, where content profile 304 and a digital content item profile share few (e.g., zero) similarities, synchronization system 106 can disregard the digital content item profile when determining score 316. In one or more embodiments, synchronization system 106 combines comparisons between content profile 304 and digital content item profiles 314a-d to determine score 316, as shown in FIG. 3.

Synchronization system 106 can determine content score by comparing features of digital content items using a variety of algorithms. For example, as mentioned above, in one or more embodiments, synchronization system 106 trains a machine learning model that compares features of digital content item profiles. As another example, in one or more embodiments, synchronization system 106 applies an algorithm that compares features of digital content items from the collection of digital content items. For instance, in one or more embodiments, synchronization system 106 applies the following formula:

$$u(x, i) = \cos(x, i) = \frac{x \cdot i}{\|x\| \cdot \|i\|}$$

where x refers to a user profile, i refers to a digital content item profile and u(x, i) refers to an estimated content score corresponding to digital content item profile i.

Determining the synchronization score for a digital content item using the content-based model as described in connection with FIG. 3 has a number of benefits and advantages. For example, determining a content score as shown in FIG. 3 enables synchronization system 106 to determine a synchronization score without collecting extensive data on co-users 110a-n of digital content management system 104 or where synchronization system 106 determines the synchronization score on a single-user case (e.g., without co-user recall data). In addition, the content score helps identify digital content items of interest where user 114 has a unique profile and/or unique recall history.

Figure 4:
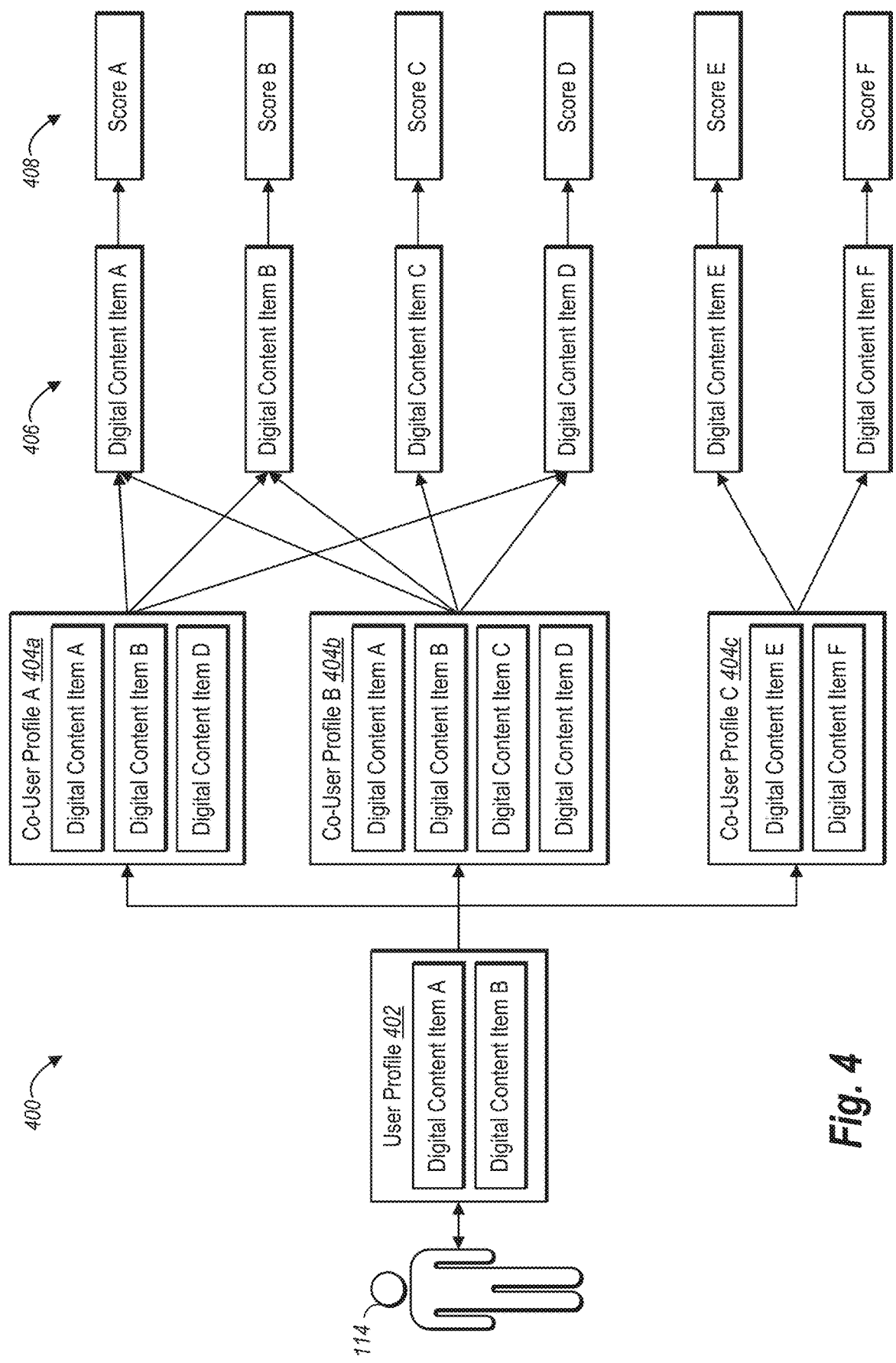
FIG. 4 illustrates an example implementation of a collaboration model in accordance with one or more embodiments.

Moving onto FIG. 4, synchronization system 106 can determine a collaboration score for a digital content item based on features associated with user 114 and co-users 110a-n of digital content management system 104. In particular, FIG. 4 illustrates an example workflow 400 in which synchronization system 106 determines correlation scores (e.g., scores A-F) for respective digital content items (e.g., digital content items A-F 406) based on a comparison of user profile 402 and co-user profiles 404a-c (e.g., from a team of co-users associated with user 114).

As shown in FIG. 4, synchronization system 106 identifies, generates, or otherwise obtains user profile 402 including user recall data associated with user 114. In particular, user profile 402 includes identifiers of digital content items that user 114 has recalled (e.g., viewed, downloaded, synchronized, etc.). For example, as shown in FIG. 4, user profile 402 includes identifiers of digital content item A and digital content item B. In addition, in one or more embodiments, user profile 402 includes data (e.g., content profile data) associated with each of the identified digital content items A and B. As further shown in FIG. 4, co-user profiles 404a-c include identifiers of digital content items and associated co-user recall data.

In determining correlation scores, synchronization system 106 compares user profile 402 to co-user profiles 404a-c associated with respective co-users (e.g., co-users 110a-n) of digital content management system 104. In particular, as shown in FIG. 4, synchronization system 106 compares user profile 402 to co-user profile A 404a, co-user profile B 404b, and co-user profile C 404c to identify co-users having a similar or largely overlapping recall history as user 114 as well as identifying digital content items that similar co-users have accessed. In one or more embodiments, synchronization system 106 determines correlation scores 408 for corresponding digital content items A-F 406 based on a level of similarity between user profiles.

For example, with respect to FIG. 4, co-user profile A 404a and co-user profile B 404b each include recall instances of digital content items A and B, similar to user profile 404. Conversely, co-user profile C 404c includes zero instances of digital content items in common with user profile 402. Accordingly, synchronization system 106 can apply greater weight to digital content items identified within co-user profiles A-B 404a-b than co-user profile C 404c in determining correlation scores 408 for respective digital content items A-F 406. In one or more embodiments, synchronization system 106 can apply no weight or simply disregard recall information associated with co-user profile C 404c based on a determination that user profile 402 and co-user profile C 404c are not similar. As a result of the comparison shown in FIG. 4, synchronization system 106 may determine higher correlation scores for digital content items A-D than digital content items E-F.

Synchronization system 106 can use various algorithms and analysis techniques to compare features and characteristics of user profiles. In one or more embodiments, synchronization system 106 trains a machine learning model to fine-tune one or more algorithms that compare features of user profiles. As another example, in one or more embodiments, synchronization system 106 applies an algorithm that compares features of user profiles with respect to digital content items recalled by users associated with the respective user profiles.

As mentioned above, in one or more embodiments, synchronization system 106 identifies co-users having similar co-user profiles as a user profile of user 114. In particular, in one or more embodiments, synchronization system 106 determines recall vectors representative of respective user profiles and compares the recall vectors using one or more different algorithms. As a first example, synchronization system 106 identifies similar users by comparing recall vectors using the following Jaccard algorithm:

$$sim(x, y) = \frac{r_x \cap r_y}{r_x \cup r_y}$$

where $r_x$ refers to a recall vector of user x and $r_y$ refers to a recall vector of user y. As another example, synchronization system 106 can identify similar users using the following Cosine similarity algorithm:

$$sim(x, y) = \cos(r_x, r_y) = \frac{r_x \cdot r_y}{\|r_x\| \cdot \|r_y\|}$$

where $r_x$ refers to a recall vector of user x and $r_y$ refers to a recall vector of user y. In another example, synchronization system 106 can identify similar users using the following Pearson correlation coefficient algorithm:

$$sim(x, y) = \frac{\Sigma_{s \in S_{xy}}(r_{xs} - \overline{r_{xs}})(r_{ys} - \overline{r_{ys}})}{\sqrt{\Sigma_{s \in S_{xy}}(r_{xs} - \overline{r_{xs}})^2} \sqrt{\Sigma_{s \in S_{xy}}(r_{ys} - \overline{r_{ys}})^2}}$$

where $S_{xy}$ refers to digital content items recalled by both users x and y.

Upon identifying similar user profiles associated with a user profile of user 114, synchronization system 106 can further utilize the similar profiles to determine collaboration scores (e.g., recall predictions) using a variety of different algorithms. For example, in one or more embodiments, synchronization system 106 determines a collaboration score based on an average of similar users using the following algorithm for N similar co-users:

$$r_{xi} = \frac{1}{k} \Sigma_{y \in N} r_{yi}$$

As an alternative to a straight or unweighted average, synchronization system 106 can determine a weighted average based on N similar users using the following algorithm:

$$r_{xi} = \frac{\Sigma_{y \in N} sim(x, y) \cdot r_{yi}}{\Sigma_{y \in N} sim(x, y)}$$

While the above algorithms relate specifically to comparing user profiles, in one or more embodiments, synchronization system 106 utilizes similar algorithms to determine collaboration scores based on a comparison between digital content profiles. For example, as an alternative to the content-based model described above in connection with FIG. 3, in one or more embodiments, synchronization system 106 utilizes a similar collaboration model to identify digital content items having similar profiles and comparing the similar profiles to determine collaboration scores for any number of digital content items. For instance, for a digital content item i and identified set of similar content items N, synchronization system 106 can determine a correlation score for digital content item i with the following algorithm, similar to the algorithm described above for determining a correlation score based on a comparison of user profiles:

$$r_{xi} = \frac{\Sigma_{j \in N(i;x)} sim(i, j) \cdot r_{xj}}{\Sigma_{j \in N(i;x)} sim(i, j)}$$

In addition, in one or more embodiments, synchronization system 106 combines the result of the correlation equations described herein to determine a correlation score for a given digital content item.

In one or more embodiments, synchronization system 106 further implements one or more optimizations to the collaborative model for determining collaboration scores for digital content items. For example, as mentioned above, synchronization system can use the following basic collaborative filtering algorithm to determine a collaboration score for a given user with respect to a digital content item:

$$r_{xi} = \frac{\Sigma_{j \in N(i;x)} \, sim(i, j) \cdot r_{xj}}{\Sigma_{j \in N(i;x)} \, sim(i, j)}$$

In addition, in one or more embodiments, synchronization system 106 extracts a bias value to account for one or more pairwise similarities that neglect interdependency among users using a convex optimization algorithm. In particular, synchronization system 106 can account for bias using the following algorithm:

$$r_{xi} = b_{xi} + \frac{\Sigma_{j \in N(i;x)} \, sim(i, j) \cdot (r_{xj} - b_{xj})}{\Sigma_{j \in N(i;x)} \, sim(i, j)}$$

where $b_{xi} = \mu + b_x + b_i$ with $\mu$ referring to an overall mean score, $b_x$ referring to a score deviation of user x and $b_i$ referring to score deviation of file i. In addition, as an alternative to arbitrarily computing sim(i, j), synchronization system 106 can estimate $w_{ij}$ from the data, which models interaction between pairs of files and not depend on user x. In particular, in one or more embodiments, synchronization system 106 the following algorithm to solve a stochastic gradient descent based on a transformed standard convex optimization problem:

$$r_{xi} = b_{xi} + \sum_{j \in N(i;x)} w_{ij}(r_{xj} - b_{xj})$$

Determining correlation scores based on a comparison of user profiles (and digital content item profiles) as described herein has a number of advantages and benefits. For example, the above described correlation algorithms facilitate effective identification of digital content items of interest for user 114 by analyzing co-user recall data associated with co-users associated with user 114. In particular, where user 114 joins a team of co-users 110a-n for a particular project, synchronization system 106 can effectively predict digital content items that will be of interest to user 114 without an extensive recall history of user 114 with respect to a number of digital content items.

Figure 5:
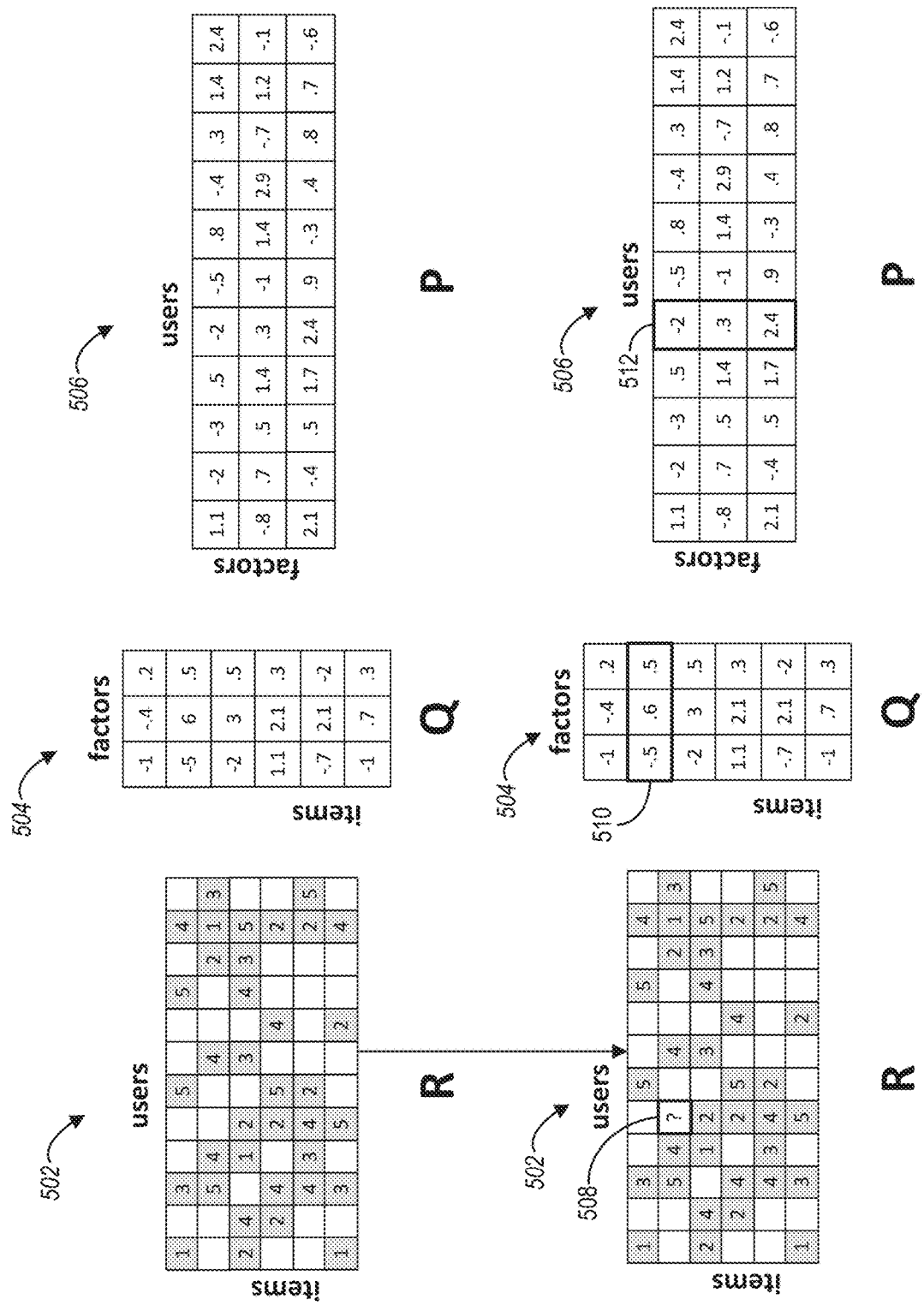
FIG. 5 illustrates an example implementation of a latent factor model in accordance with one or more embodiments.

Proceeding onto FIG. 5, synchronization system 106 can determine a latent factor score for digital content items based on recall values associated with corresponding users of digital content management system 104 and digital content items of the collection of digital content items. For example, as shown in FIG. 5, synchronization system 106 identifies scores for users of digital content management system 104 with respect to digital content items (e.g., with respect to individual files or folders) based on recall information including interactions by the users of digital content management system 104 with respect to the digital content items.

In one or more embodiments, synchronization system 106 generates a score for each digital content item based on identified recall data. In addition, as shown in FIG. 5, synchronization system 106 maps the determined scores to score matrix 502 including scores for digital content items with respect to users who have recalled the digital content items. As shown in FIG. 5, score matrix 502 includes scores within respective fields of score matrix 502 for digital content items that have been recalled. In particular, as shown in FIG. 5, score matrix 502 includes a 6×12 matrix including a mapping between digital content items (e.g., six digital content items) and users (e.g., twelve users) of digital content management system 104.

Synchronization system 106 can determine scores for respective fields of score matrix 502 in a variety of ways. For example, in one or more embodiments, synchronization system 106 utilizes the content-based model and/or correlation model to determine respective scores within score matrix 502. As another example, synchronization system 106 can assign a score based on a number of times a user of digital content management system 104 has recalled a digital content item. In one or more embodiments, synchronization system 106 receives global recall data for one or more digital content items and populates the fields of score matrix 502 based on global recall data (e.g., recall data from any number of users having access to digital content item).

As further shown, score matrix 502 includes blank or null scores within respective fields of score matrix 502 for digital content items for which recall data is limited (e.g., unavailable or does not exist because the digital content item has not been recalled). In one or more embodiments, synchronization system 106 utilizes known values of score matrix 502 to extrapolate scores for pairings of users and corresponding digital content items. For example, synchronization system 106 extrapolates scores for pairings having limited recall data (e.g., no recall data) based on scores for pairings that have more extensive recall data. In particular, as shown in FIG. 5, synchronization system 106 extrapolates scores for fields of score matrix 502 having blank or null scores based on fields of score matrix 502 having known scores.

In one or more embodiments, synchronization system 106 factorizes score matrix 502 based on the known values of score matrix 502. In particular, synchronization system 106 can factorize score matrix 502 into Q-Matrix 504 and P-Matrix 506 (e.g., $P^T$-Matrix) for the known values of score matrix 502. As shown in FIG. 5, Q-Matrix 504 includes a 3×6 matrix including a mapping between digital content items and corresponding factors (e.g., digital content item features). As further shown, P-Matrix 506 includes a 3×12 matrix including a mapping between users of digital content management system 104 and corresponding factors (e.g., user characteristics). In the example shown in FIG. 5, synchronization system 106 utilizes a low-rank 3 approximation to factorize score matrix 502 into Q-Matrix 504 and P-Matrix 506. In one or more embodiments, synchronization system 106 utilizes other minimization functions to measure the fit between a given matrix (e.g., score matrix 502) and approximating matrix (e.g., score matrix 502 with estimated values in place of empty fields).

As shown in FIG. 5, synchronization system 106 can determine or estimate values of the missing fields of score matrix 502 by performing a dot product of corresponding rows and columns of Q-Matrix 504 and P-Matrix 506. For example, synchronization system 106 can utilize the following algorithm to estimate a respective field of score matrix 502:

$$r_{xi} = \Sigma_f q_{if} p_{xf}$$

where $r_{xi}$ refers to a missing value of score matrix 502 corresponding to user x for digital content item i, $q_i$ refers to row i of matrix-Q 504, and $p_x$ refers to column x of matrix-P 506. In particular, as shown in FIG. 5, synchronization system 106 determines score for blank cell 508 corresponding to row 1, column 4 (counting from row 0 and column 0) by computing a dot-product of column one 510 (counting from column 0) from matrix-Q 504 and row four 512 (counting from row 0) from matrix-P. Synchronization system 106 can similarly determine unknown values for each of the cells of score matrix 502.

In one or more embodiments, synchronization system 106 performs one or more additional optimizations to fine-tune or otherwise refine determined values of score matrix 502. For example, in one or more embodiments, in addition to the above algorithm for estimating respective fields of score matrix 502, synchronization system 106 determines unknown values of score matrix 502 by minimizing the following optimization algorithm:

$$\min_{P,Q} \Sigma_{(i,x) \in R}(r_{xi} - q_i \cdot p_x)^2 + [\lambda_1 \Sigma_x \|p_x\|^2 + \lambda_1 \Sigma_i \|q_i\|^2]$$

where Q and P need not be orthogonal, in contrast to a single value decomposition, and the last two terms provide regulation to prevent overfitting when determining the unknown values of score matrix 502.

Accordingly, in one or more embodiments, synchronization system 106 utilizes scores from score matrix 502 to determine latent factor scores for each of the digital content items from the collection of digital content items. Indeed, predicting scores based on the latent factor model described in FIG. 5 improves upon the accuracy of other prediction models by utilizing machine learning optimization to capture the global and local correlation between users and files.

As mentioned above, synchronization system 106 can utilize each of the above described analysis models alone or in combination. For example, in one or more embodiments, synchronization system 106 utilizes content-based model 204 including features and functionality described in connection with FIG. 3 to determine a correlation score indicative of a probability that user 114 will synchronize a given digital content item. In addition, in one or more embodiments, synchronization system 106 utilizes collaboration model 206 including features and functionality described in connection with FIG. 4 to determine a correlation score indicative of a probability that user 114 will synchronize a given digital content item. Further, in one or more embodiments, synchronization system 106 utilizes latent factor model 208 including features and functionality described in connection with FIG. 5 to determine a latent factor score indicative of a probability that user 114 will synchronize a given digital content item. Moreover, in one or more embodiments, synchronization system 106 utilizes a combination of some or all of the analysis models 204-208 to determine a synchronization score.

Utilizing the synchronization prediction model 202 including individual or a combination of the above-described analysis models provides a substantial improvement over conventional methods for determining one or more digital content items to synchronize to a local storage of a client device. In particular, each of the above-described analysis models provide an improvement over random predictions for a sample set of recalls by users of digital content items 104. For example, using the following algorithm:

$$\text{Position Weighted Hit Rate} = \frac{\Sigma \text{ Hits}}{\text{Number of Recommended Files}}$$

An accuracy of the above-described models can be demonstrated, where "Hits" refers to instances of recall of a given digital content item by a given user of digital content management system 104. Further, when used in combination, synchronization system 106 achieves improved accuracy over random prediction methods.

Figure 6:
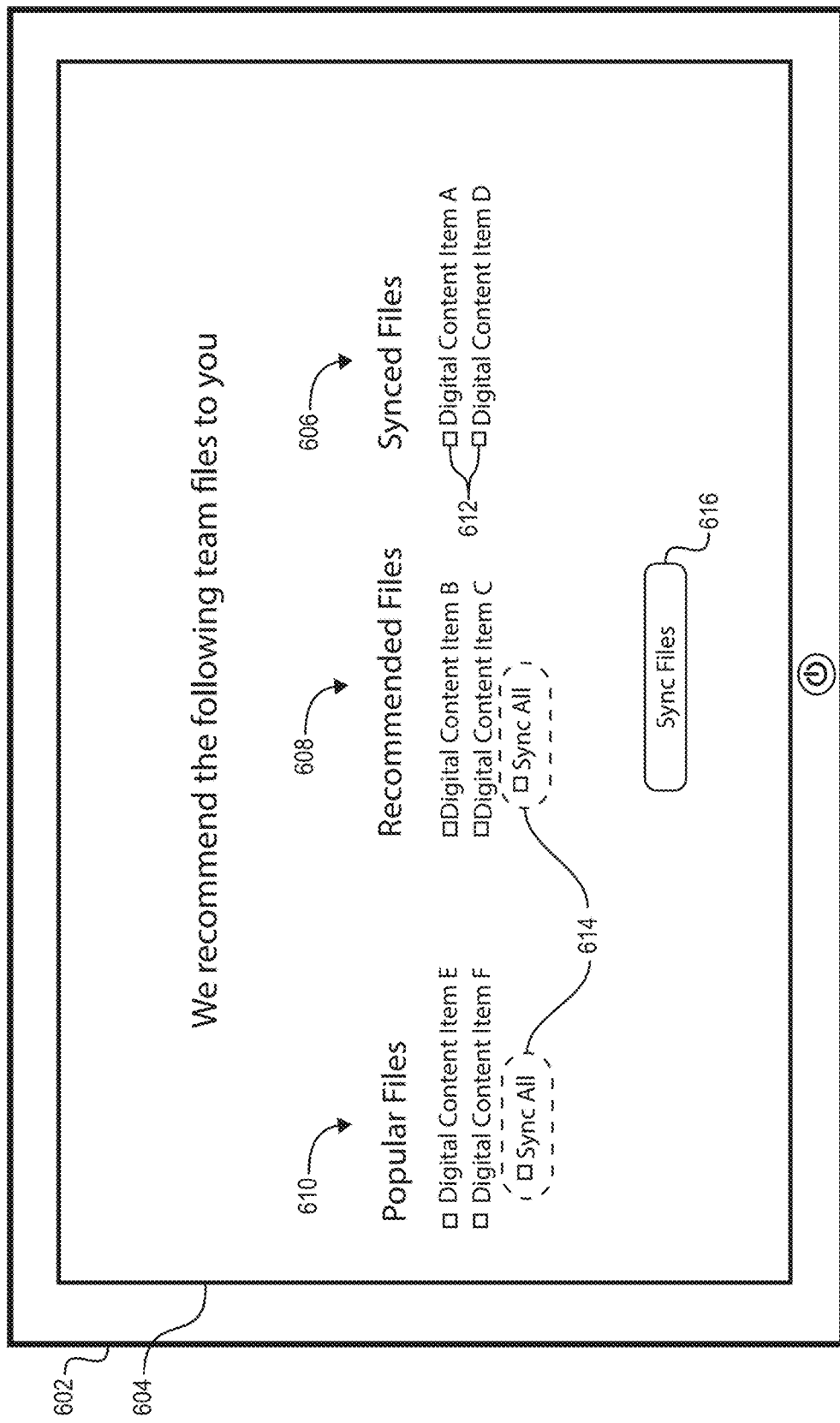
FIG. 6 illustrates an example client device including synchronization recommendations provided in accordance with one or more embodiments.

As mentioned above, synchronization system 106 can provide one or more synchronization recommendations to user 114 via a graphical user interface of client device 112 based on determined synchronization scores in accordance with one or more embodiments described herein. For example, FIG. 6 illustrates example client device 602 including graphical user interface 604 for displaying one or more synchronization recommendations in accordance with determined synchronization scores for respective digital content items. In particular, as shown in FIG. 6, synchronization system 106 provides (or causes client device 602 to provide) synchronization recommendations including, for example, automatically synchronized files 606, recommended files 608 for synchronization, and popular files 610. While FIG. 6 illustrates client device 602 including a personal computer device, synchronization system 106 can similarly provide synchronization recommendations via a mobile device or other computing device.

As shown in FIG. 6, synchronization system 106 can provide synchronization recommendation in accordance with ranges of synchronization scores. For example, synchronization system 106 can automatically synchronize digital content items A and D based on a determination that digital content items A and D have very high synchronization scores. In particular, synchronization system 106 can automatically synchronize digital content items A and D based on a determination that synchronization scores for digital content items A and D exceed a first threshold score (e.g., a high threshold score) associated with a very high likelihood that a user of client device 602 would synchronize digital content items A and D.

As another example, synchronization system 106 can provide recommended files 608 for synchronization including digital content items B and C based on a determination that digital content items B and C have high synchronization scores. In particular, synchronization system 106 can provide recommended files 608 for synchronization including digital content items B and C based on a determination that synchronization scores for digital content items B and C exceed a second threshold score (e.g., a medium threshold score) without exceeding the first threshold score associated with a threshold probability that a user of client device 602 would synchronize digital content items B and C. Synchronization system 106 can utilize one or more additional threshold scores in identifying synchronization recommendations. For example, synchronization system 106 can utilize one or more user set thresholds (e.g., a threshold manually set or selected by a user) for automatically synchronizing and/or recommending digital content items for synchronization. Alternatively, synchronization system 106 can utilize one or more system set (e.g., a default threshold) for automatically synchronizing and/or recommending digital content items for synchronization.

Moreover, while automatically synchronized files 606 and recommended files 608 may refer to files uniquely suited to a user of client device 602, in one or more embodiments, synchronization system 106 may provide a list of popular files 610 including one or more digital content items generally popular to users of digital content management system 104 (while not necessarily including digital content items having synchronization scores that exceed one or more predetermined threshold scores). Popular files 610 can include default files, template files, setup files, or other files that are popular, but not frequently or recently recalled by users of digital content management system 104.

As further shown, synchronization system 106 can provide one or more synchronization options that enable a user of client device 602 to select one more digital content items to synchronize based on the recommendations. For example, as shown in FIG. 6, synchronization system 106 provides individual selection options 612 that enable a user of client device 602 to select individual digital content items from the recommended digital content items. For example, a user can select or deselect individual digital content items for synchronization by selecting one or more of individual selection options 612.

In addition, synchronization system 106 provides selectable options to enable a user of client device 602 to synchronize multiple files at once. For example, synchronization system 106 provides sync all options 614 for respective categories (e.g., recommended files 608, popular files 610) that enable a user of client device 602 to select multiple digital content items within a single category for synchronization. In addition, synchronization system 106 provides a sync files option 616 that enables a user of client device 602 to select all displayed options for synchronization to a local storage of client device 602. Alternatively, in one or more embodiments, synchronization system 106 provides one or more options to unsynchronize (e.g., delete from local storage) individual files and/or categories of files.

Figure 7:
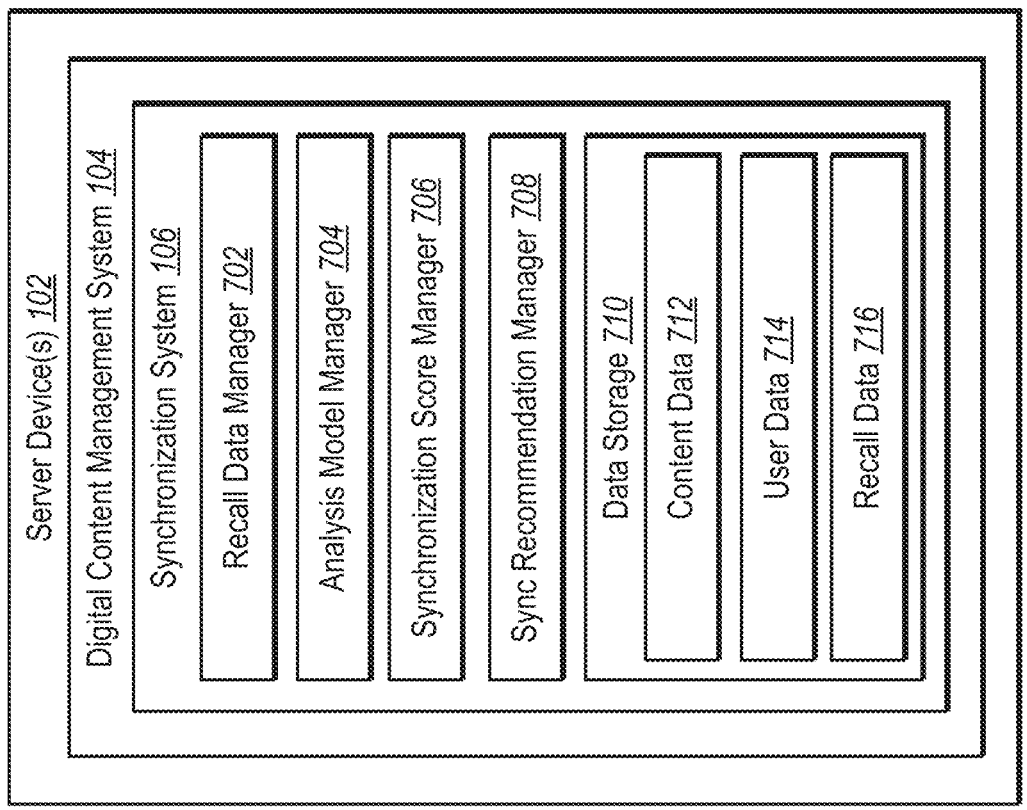
FIG. 7 illustrates a schematic diagram of a server device including the synchronization system in accordance with one or more embodiments.

Turning now to FIG. 7, additional detail will be provided regarding components and capabilities of example architecture for synchronization system 106 that may be implemented on server device(s) 102, client device 112, co-user devices 110a-n or a combination of one or more of server device(s) 102, client device 112, and co-user devices 110a-n. In particular, FIG. 7 illustrates one implementation of server device(s) 102 having similar features and functionality associated with one or more embodiments described above. For example, synchronization system 106 can provide features and functionality associated with identifying digital content items for determining synchronization scores for a collection of digital content items on digital content management system 104 and selectively identifying digital content items to synchronize to a local storage space of client device 112.

As shown in FIG. 7, server device(s) 102 includes digital content management system 104. In one or more embodiments, digital content management system 104 refers to a remote storage system for remotely storing digital content item on a storage space associated with a user account. Digital content management system 104 includes synchronization system 106, which includes recall data manager 702, analysis model manager 704, synchronization score manager 706, sync recommendation manager 708, and data storage 710, which includes content data 712, user data 714, and recall data 716.

In one or more embodiments, components of synchronization system 106 may, for example, be implemented as one or more stand-alone applications, as one or more modules of an application, as one or more plug-ins, as one or more library functions or functions that may be called by other applications (e.g., a web application), and/or as a cloud-computing model.

In addition, while FIG. 7 shows an example embodiment in which the components 702-716 are implemented on server device(s) 102, it will be understood that the components 702-716 may be implemented wholly or partially on client device 112, co-user client devices 110a-n, one or more server device(s), or a combination thereof. In addition, while FIG. 7 shows that data storage 710 is implemented entirely on the server device(s) 102, the information contained within data storage 710 can be located within a corresponding data storage on server device(s) 102 and/or stored collectively between data storages accessible to client device 112 and/or co-user client devices 110a-n.

As shown in FIG. 7, synchronization system 106 includes recall data manager 702. In one or more embodiments, recall data manager 702 collects recall data including a history of interactions (e.g., recall history) by user 114 with respect to digital content items. In addition, recall data manager 702 collects recall data associated with co-users 110a-n of digital content management system 104. In one or more embodiments, recall data manager 702 tracks recall data including instances that user 114 and/or co-users 110a-n have accessed, viewed, downloaded, synchronized, edited, or otherwise interacted with respective digital content items.

In one or more embodiments, recall data manager 702 generates profiles for users and digital content items. For example, recall data manager 702 can generate a user profile including recall data for a respective user (e.g., user 114, co-users 110a-n) of digital content management system 104. In addition, recall data manager 702 can generate content profiles for each of the digital content items including recall data associated with the digital content items in addition to file information (e.g., file owner, namespace, file extension, etc.).

As further shown in FIG. 7, synchronization system 106 includes analysis model manager 704. In one or more embodiments, analysis model manager 704 trains one or more analysis models to output scores associated with a probability that a given user will synchronize a digital content item associated with the score(s). For example, in one or more embodiments, analysis model manager 704 trains one or more machine learning models to analyze recall data including user profiles, content profiles, and content file data to determine a likelihood that a given user associated with a set of features will synchronize a given digital content item with a set of features. In one or more embodiments described herein, analysis model manager 704 trains content-based model 204, collaboration model 206, and/or latent factor model 208 in accordance with one or more embodiments herein.

As further shown in FIG. 7, synchronization system 106 includes synchronization score manager 706. In one or more embodiments, synchronization score manager 706 determines a synchronization score for a digital content item by implementing one or more analysis models for analyzing recall data of user 114 and co-users 110a-n. For example, in one or more embodiments, synchronization score manager 706 utilizes content-based model 204, collaboration model 206, and/or latent factor model 208 to determine synchronization scores for a collection of digital content items with respect to user 114.

As mentioned above, in one or more embodiments, synchronization score manager 706 determines a synchronization score by combining results of multiple analysis models. For example, in one or more embodiments, synchronization score manager 706 utilizes a combiner function (e.g., combiner function 210) to combine outputs of respective analysis models. In one or more embodiments, synchronization score manager 706 determines a synchronization score by summing the outputs of the analysis models. Alternatively, in one or more embodiments, synchronization score manager 706 determines a synchronization score by applying different weights to the outputs of the analysis models.

For example, in one or more embodiments, synchronization score manager 706 applies different weights to respective outputs of analysis models 204-208 based on one or more factors associated with user 114 and/or respective digital content items. For instance, where user 114 is a new user of digital content management system 104 and has a limited recall history, synchronization score manager 706 may apply a higher weight to an output of content-based model 204 while applying a lower weight to an output of collaboration model 206 in combining the outputs to determine the synchronization score. Alternatively, where user 114 has an extensive recall history, synchronization score manager 706 can apply a higher weight to an output of collaboration model 206. Moreover, because latent factor model 208 often yields more accurate results individually than content-based model 204 and/or collaboration model 206, in one or more embodiments, synchronization score manager 706 applies the highest weight to the output of latent factor-based model 208.

As further shown in FIG. 7, synchronization system 106 includes sync recommendation manager 708. In one or more embodiments, sync recommendation manager 708 identifies digital content items to recommend for synchronization to user 114. For example, sync recommendation manager 708 can identify a subset of digital content items accessible to user 114 (e.g., a subset of digital content items associated with a user account) and recommend synchronization to a local storage of client device 112 associated with user 114. As discussed above in connection with FIG. 6, sync recommendation manager 708 can provide synchronization recommendations via a graphical user interface of client device 112.

In one or more embodiments, sync recommendation manager 708 provides different types of synchronization recommendations based on determined synchronization scores. For example, in one or more embodiments, sync recommendation manager 708 compares a synchronization score for a given digital content item to multiple thresholds corresponding with different recommendation-types. For instance, in one or more embodiments, sync recommendation manager 708 determines whether a synchronization score exceeds a high threshold corresponding to a near certainty that user 114 will synchronize a digital content item to a local storage of client device 112. If the synchronization score exceeds the high threshold, sync recommendation manager 708 automatically synchronizes the digital content item for user 114. As another example, sync recommendation manager 708 can provide a recommendation to synchronize (e.g., without automatically synchronizing) including a selectable option to synchronize based on determining that a synchronization score for a digital content item exceeds a recommendation threshold without exceeding the high threshold associated with automatic synchronization. Sync recommendation manager 708 can similarly compare synchronization scores with other thresholds associated with different types of recommendations.

In one or more embodiments, synchronization system 106 includes a collaboration service that provides an interactive content item collaboration platform whereby users (e.g., user 114 and co-users 110a-n) can simultaneously create collaboration content items, comment in the collaboration content items, and manage tasks within the collaboration content items. Collaboration content items can be files that users can create and edit using a collaboration content item editor and can contain collaboration content item elements. Collaboration content item elements may include a collaboration content item identifier, one or more author identifiers, collaboration content item text, collaboration content item attributes, interaction information, comments, sharing users, etc. Collaboration content item elements can be stored as database entities, which allows for searching and retrieving the collaboration content items. Multiple users may access, view, edit, and collaborate on collaboration content items at the same time or at different times. In some embodiments, this can be managed by requiring two users access a content item through a web interface and there they can work on the same copy of the content item at the same time.

As further shown in FIG. 7, synchronization system 106 includes data storage 710 including content data 712. Content data 712 can include any information associated with digital content items associated with a user account. For example, content data 712 can include content profiles including namespace data, owner data, recall data, file extension data, and other file data associated with respective digital content items.

In addition, data storage 710 includes user data 714. User data 714 can include any information associated with a given user of digital content management system 104. For example, user data 714 can include a recall history including identified digital content items that an associated user has recalled. In one or more embodiments, user data 714 includes user profiles for any number of users of digital content management system 104 including recall histories, identifiers of digital content items to which users have access, and other information associated with respective users.

As further shown, data storage 710 includes recall data 716. Recall data 716 can include any recall data by user 114 and co-users 110a-n of digital content management system 104 with respect to digital content items recalled by user 114 and/or co-users 110a-n of digital content management system 104. For example, recall data 716 can include identified digital content items that users have recalled in addition to information about interactions by the user with respect to the recalled digital content items. In addition, recall data 716 can include information about frequency of recall by users (e.g., collectively or individually) of digital content management system 104.

Each of the components 702-716 can comprise software, hardware, or both. For example, components 702-716 can comprise one or more instructions stored on a computer-readable storage medium and executable by processors of one or more computing devices. When executed by the one or more processors, the computer-executable instructions of synchronization system 106 can cause a server device and/or client device to perform the methods described herein. Alternatively, components 702-716 and their corresponding elements can comprise hardware, such as a special purpose processing device to perform a certain function or group of functions. Additionally, components 702-716 can comprise a combination of computer-executable instructions and hardware.

Furthermore, components 702-716 may, for example, be implemented as one or more operating systems, as one or more stand-alone applications, as one or more modules of an application, as one or more plug-ins, as one or more library functions or functions that may be called by other applications, and/or as a cloud-computing model. Thus, components 702-716 may be implemented as a stand-alone application, such as a desktop or mobile application. Furthermore, components 702-716 may be implemented as one or more web-based applications hosted on a remote server. Components 702-716 may also be implemented in a suite of mobile device applications or "apps."

Figure 8:
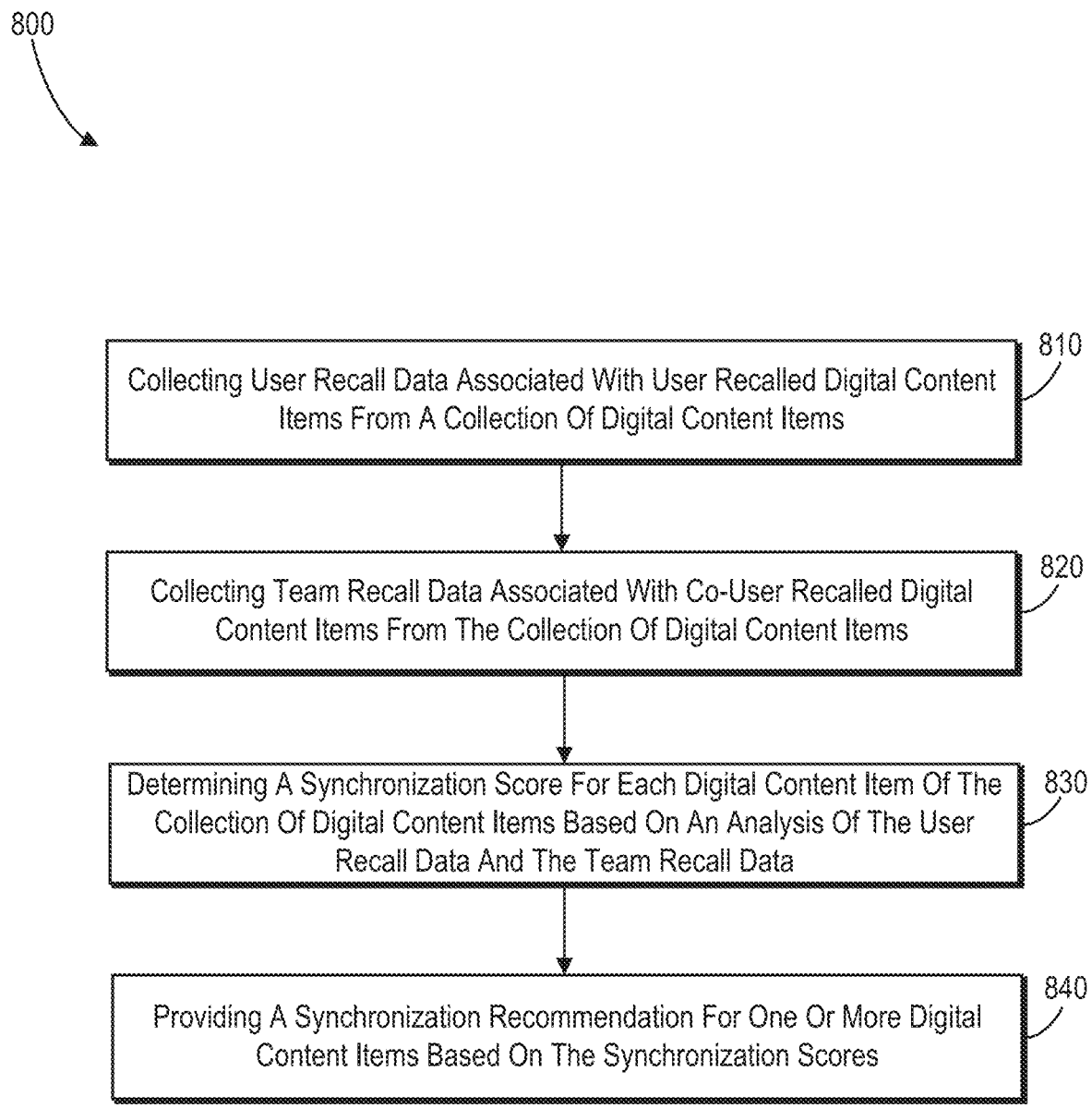
FIG. 8 illustrates a flowchart of a series of acts in a method for determining synchronization scores in accordance with one or more embodiments.

Turning now to FIG. 8, this figure illustrates a flowchart of a method 800 that includes collecting recall data for a collection of digital content items to identify one or more digital content items to recommend for synchronization to a local storage of a user client device. While FIG. 8 illustrates a method 800 according in accordance with one or more embodiments, alternative embodiments may omit, add to, reorder, and/or modify any of the acts shown in FIG. 8. In one or more embodiments, the acts of FIG. 8 may be performed as part of a method. Alternatively, a non-transitory computer readable medium can comprise instructions, that when executed by one or more processors, cause a computing device to perform the acts of FIG. 8. In still further embodiments, a system can perform the acts of FIG. 8.

FIG. 8 further illustrates a flowchart of an example method 800 for determining synchronization scores for digital content items based on recall data of users (e.g., data of user accounts) of digital content management system 104. For instance, as shown in FIG. 8, method 800 includes collecting 810 user recall data associated with user recalled digital content items. For example, in one or more embodiments, method 800 includes collecting user recall data associated with recalled digital content items by a user account of a digital content management system (e.g., digital content management system 104), the collection of digital content items comprising a plurality digital content items on a digital content management system accessible via a user account of the user.

As further shown in FIG. 8, method 800 includes collecting 820 team recall data associated with co-user recalled digital content items from the collection of digital content items. For example, in one or more embodiments, method 800 includes collecting team recall data associated with recalled digital content items from the collection of digital content items by co-users (e.g., co-user accounts) of the digital content management system associated with the user, the recall data comprising an identification of digital content items that one or more of the co-user accounts have synchronized. In one or more embodiments, method 800 further includes generating user profiles and/or content profiles based on the collected user recall data and team recall data.

As further shown in FIG. 8, method 800 includes determining 830 a synchronization score for each digital content item of the collection of digital content items based on an analysis of the user recall data and the team recall data. For example, in one or more embodiments, method 800 includes determining a synchronization score for the user account with respect to each digital content item of the collection of digital content items based on an analysis of the user recall data and the team recall data where the synchronization score is associated with a prediction that the user account will synchronize the digital content item.

In one or more embodiments, method 800 includes determining the synchronization score for each digital content item from the collection of digital content items using a content-based analysis model (e.g., content-based model 204). For example, in one or more embodiments, method 800 includes constructing (e.g., from the user recall and team recall data) a content profile for the digital content item including file data for the digital content item and a history of interactions by the user account and the co-user accounts with respect to the digital content item. In addition, in one or more embodiments, method 800 includes generating the synchronization score based on a comparison between the content profile for the digital content item and content profiles for the recalled digital content items by the user account (from the user recall data) and the recalled digital content items by the co-user accounts (from the team recall data).

In one or more embodiments, method 800 includes determining the synchronization score for each digital content item using a collaboration analysis model (e.g., collaboration model 206). For example, in one or more embodiments, method 800 includes comparing identifiers of recalled digital content items from the user recall data with identifiers of recalled digital content items from the team recall data to identify a subset of co-users (e.g., a subset of co-user accounts) from the co-users (e.g., the co-user accounts) of the digital content management system having a similar recall history as the user account associated with the client device with respect to the collection of digital content items. In addition, in one or more embodiments, method 800 includes generating the synchronization score based on a comparison of the user recall data and team recall data associated with the subset of co-users (e.g., without considering team recall data from co-user accounts not included within the subset of co-user accounts).

In one or more embodiments, method 800 includes determining the synchronization score for each digital content item using a latent factor analysis model (e.g., latent factor model 208). For example, in one or more embodiments, method 800 includes generating a matrix (e.g., score matrix 502) representative of a recall history of users (e.g., user accounts) of the digital content management system with respect to the collection of digital content items. In one or more embodiments, the matrix includes a first plurality of fields including known scores between pairs of users (e.g., user accounts) of the digital content management system and digital content items that have been recalled by respective users of the digital content management system and a second plurality of fields including unknown scores between pairs of users and digital content items that have not been recalled by respective users of the digital content management system. In addition, in one or more embodiments, method 800 includes extrapolating scores for the second plurality of fields based on the known scores of the first plurality of fields.

In one or more embodiments, extrapolating the scores for the second plurality of fields includes factorizing the matrix to generate a Q-Matrix and a P-Matrix based on the known scores of the first plurality of fields. Extrapolating the scores can further include determining, for each field of the second plurality of fields of the matrix, a dot product of corresponding rows and columns of the Q-Matrix and the P-Matrix. In one or more embodiments, method 800 further includes determining the synchronization score based on the known values of the first plurality of fields of the matrix and the extrapolated scores for the second plurality of fields of the matrix.

As further shown in FIG. 8, method 800 includes providing 840 a synchronization recommendation for one or more digital content items based on the synchronization scores. For example, in one or more embodiments, method 800 includes providing, via a graphical user interface of a client device associated with the user account of the user, a synchronization recommendation for one or more digital content items from the collection of digital content items based on synchronization scores for the user account with respect to the one or more digital content items exceeding a threshold score.

In one or more embodiments, method 800 further includes detecting a selection (e.g., a user input) of the synchronization recommendation. For example, in one or more embodiments, providing the synchronization recommendation includes providing a selectable option corresponding to one or more identified digital content items (e.g., digital content items having a synchronization score that exceeds a threshold synchronization score). In addition, in one or more embodiments, method 800 includes synchronizing (e.g., automatically or in response to detecting a user selection of the selectable option) the one or more digital content items by downloading one or more copies of the one or more digital content items to a local storage of the client device where the one or more copies of the one or more digital content items (e.g., corresponding to one or more high resolution or original copies of the one or more digital content items maintained on the digital content management system). In one or more embodiments, synchronizing the one or more digital content items includes periodically updating the one or more copies of the one or more digital content items to correspond to one or more current versions of the one or more digital content items maintained on the digital content management system.

In one or more embodiments, method 800 includes identifying a first plurality of content items having synchronization scores that exceed a first threshold. In addition, in one or more embodiments, method 800 includes based on the first plurality of content items exceeding the first threshold, automatically synchronizing the first plurality of content items to a local storage of the client device of the user (e.g., based on the synchronization scores exceeding the first threshold and without receiving additional user input or requiring additional user action prior to synchronizing the first plurality of digital content items). In one or more embodiments, method 800 includes identifying a second plurality of content items having synchronization scores that exceed a second threshold without exceeding the first threshold. Further, in one or more embodiments, method 800 includes, based on the second plurality of content items exceeding the second threshold without exceeding the first threshold, providing the recommendation to synchronize the second plurality of content items to the client device without automatically synchronizing the second plurality of content items to the local storage of the client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
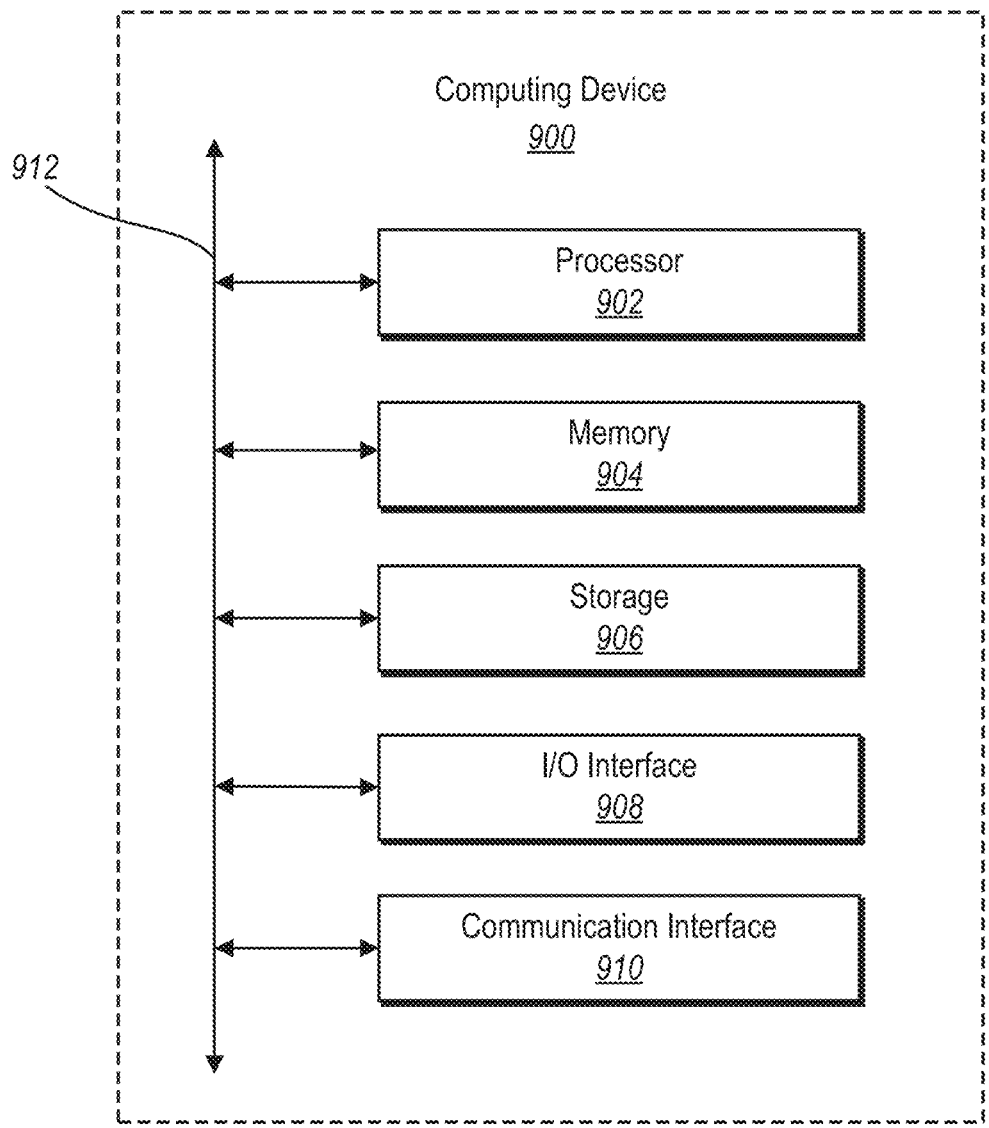
FIG. 9 illustrates a block diagram of a computing device in accordance with one or more embodiments.

FIG. 9 illustrates a block diagram of exemplary computing device 900 that may be configured to perform one or more of the processes described above. One will appreciate that client devices 108a-n and/or server device(s) 102 may comprise one or more computing devices such as computing device 900. As shown by FIG. 9, computing device 900 can comprise processor 902, memory 904, storage device 906, I/O interface 908, and communication interface 910, which may be communicatively coupled by way of communication infrastructure 912. While an exemplary computing device 900 is shown in FIG. 9, the components illustrated in FIG. 9 are not intended to be limiting. Additional or alternative components may be used in other embodiments. Furthermore, in certain embodiments, computing device 900 can include fewer components than those shown in FIG. 9. Components of computing device 900 shown in FIG. 9 will now be described in additional detail.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage device 906 and decode and execute them. In particular embodiments, processor 902 may include one or more internal caches for data, instructions, or addresses. As an example and not by way of limitation, processor 902 may include one or more instruction caches, one or more data caches, and one or more translation lookaside buffers (TLBs). Instructions in the instruction caches may be copies of instructions in memory 904 or storage 906.

Memory 904 may be used for storing data, metadata, and programs for execution by the processor(s). Memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 904 may be internal or distributed memory.

Storage device 906 includes storage for storing data or instructions. As an example and not by way of limitation, storage device 906 can comprise a non-transitory storage medium described above. Storage device 906 may include a hard disk drive (HDD), a floppy disk drive, flash memory, an optical disc, a magneto-optical disc, magnetic tape, or a Universal Serial Bus (USB) drive or a combination of two or more of these. Storage device 906 may include removable or non-removable (or fixed) media, where appropriate. Storage device 906 may be internal or external to computing device 900. In particular embodiments, storage device 906 is non-volatile, solid-state memory. In other embodiments, Storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 908 allows a user to provide input to, receive output from, and otherwise transfer data to and receive data from computing device 900. I/O interface 908 may include a mouse, a keypad or a keyboard, a touch screen, a camera, an optical scanner, network interface, modem, other known I/O devices or a combination of such I/O interfaces. I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 908 is configured to provide graphical data to a display for presentation to a user. The graphical data may be representative of one or more graphical user interfaces and/or any other graphical content as may serve a particular implementation.

Communication interface 910 can include hardware, software, or both. In any event, communication interface 910 can provide one or more interfaces for communication (such as, for example, packet-based communication) between computing device 900 and one or more other computing devices or networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 912 may include hardware, software, or both that couples components of computing device 900 to each other. As an example and not by way of limitation, communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 10:
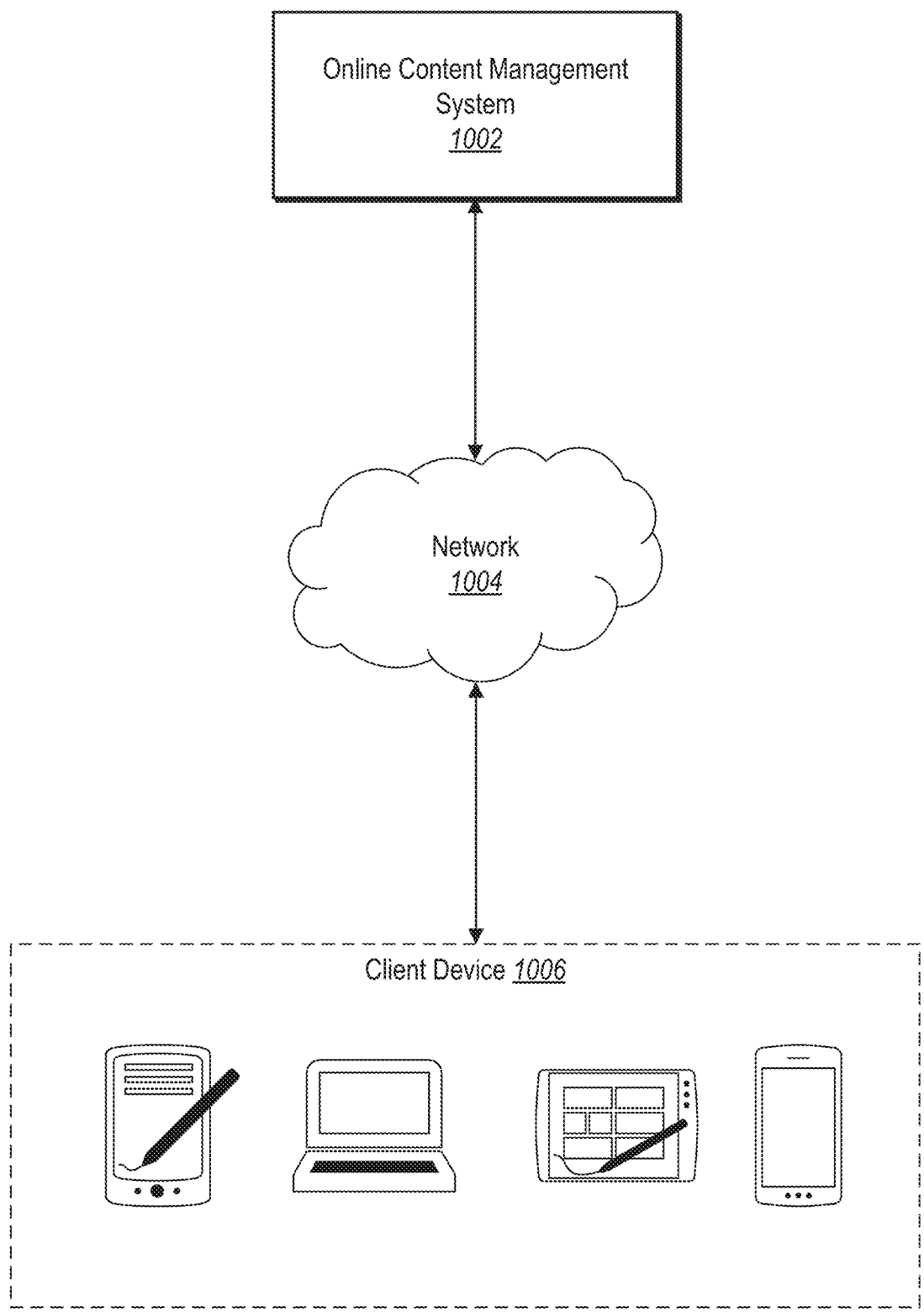
FIG. 10 illustrates a networking environment of a digital content management system in accordance with one or more embodiments.

FIG. 10 is a schematic diagram illustrating an environment within which synchronization system 106 can be implemented. Online content management system 1002 may generate, store, manage, receive, and send digital content (such as digital videos). For example, online content management system 1002 may send and receive digital content to and from client devices 1006 by way of network 1004. In particular, online content management system 1002 can store and manage a collection of digital content. Online content management system 1002 can manage the sharing of digital content between computing devices associated with a plurality of users. For instance, online content management system 1002 can facilitate a user sharing a digital content with another user of online content management system 1002.

In particular, online content management system 1002 can manage synchronizing digital content across multiple client devices 1006 associated with one or more users. For example, a user may edit digital content using client device 1006. The online content management system 1002 can cause client device 1006 to send the edited digital content to online content management system 1002. Online content management system 1002 then synchronizes the edited digital content on one or more additional computing devices.

In addition to synchronizing digital content across multiple devices, one or more embodiments of online content management system 1002 can provide an efficient storage option for users that have large collections of digital content. For example, online content management system 1002 can store a collection of digital content on online content management system 1002, while the client device 1006 only stores reduced-sized versions of the digital content. A user can navigate and browse the reduced-sized versions (e.g., a thumbnail of a digital image) of the digital content on client device 1006. In particular, one way in which a user can experience digital content is to browse the reduced-sized versions of the digital content on client device 1006.

Another way in which a user can experience digital content is to select a reduced-size version of digital content to request the full- or high-resolution version of digital content from online content management system 1002. In particular, upon a user selecting a reduced-sized version of digital content, client device 1006 sends a request to online content management system 1002 requesting the digital content associated with the reduced-sized version of the digital content. Online content management system 1002 can respond to the request by sending the digital content to client device 1006. Client device 1002, upon receiving the digital content, can then present the digital content to the user. In this way, a user can have access to large collections of digital content while minimizing the amount of resources used on client device 1006.

Client device 1006 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1006 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 1004.

Network 1004 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1006 may access online content management system 1002.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A method comprising:
 identifying a team comprising a user account and a set of additional user accounts having joint access to a shared collection of digital content items stored via a digital content management system;
 collecting user recall data associated with digital content items edited by the user account from the shared collection of digital content items, the user recall data comprising an indication of a number of times the user account edited a digital content item of the digital content items;

collecting team recall data associated with additional digital content items edited by the set of additional user accounts from the shared collection of digital content items, the team recall data comprising an indication of a number of times the set of additional user accounts edited a digital content item of the additional digital content items;

determining a synchronization score for the user account with respect to each digital content item of the shared collection of digital content items based on an analysis of the digital content items edited by the user account and the additional digital content items edited by the set of additional user accounts according to the user recall data and the team recall data, wherein the synchronization score is associated with a prediction that the user account will locally synchronize a particular digital content item from the shared collection of digital content items; and based on determining that a set of synchronization scores for a set of digital content items satisfy synchronization criteria, automatically synchronizing the set of digital content items to a client device.

2. The method of claim 1, wherein:

collecting the user recall data comprises determining a first set of edit instances and an associated first set of timestamps corresponding to the user account editing a digital content item of the digital content items; and collecting the team recall data comprises determining a second set of edit instances and an associated second set of timestamps corresponding to the set of additional user accounts editing a digital content item of the additional digital content items.

3. The method of claim 2, further comprising determining the synchronization score for the set of digital content items based on the first set of edit instances the associated first set of timestamps, the second set of edit instances, and the associated second set of timestamps.

4. The method of claim 1, wherein determining the synchronization score for the user account with respect to each digital content item of the shared collection of digital content items comprises:

constructing, from the user recall data and the team recall data, a content profile for a digital content item comprising file data for the digital content item and a history of interactions by the user account and the set of additional user accounts with respect to the digital content item; and generating the synchronization score based on a comparison between the content profile for the digital content item and content profiles for the digital content items from the user recall data and the additional digital content items from the team recall data.

5. The method of claim 1, wherein determining the synchronization score for the user account with respect to each digital content item of the shared collection of digital content items comprises:

comparing identifiers of the digital content items from the user recall data with identifiers of the additional digital content items from the team recall data to identify a subset of the additional user accounts having a similar recall history as the user account associated with the client device with respect to the shared collection of digital content items; and generating the synchronization score based on a comparison of the user recall data and team recall data associated with the subset of the additional user accounts.

6. The method of claim 1, further comprising:

generating a matrix representative of a recall history of user accounts of the digital content management system with respect to the shared collection of digital content items, the matrix comprising:

a first plurality of fields comprising known scores between pairs of user accounts of the digital content management system and digital content items that have been recalled by respective user accounts of the digital content management system in accordance with the user recall data and the team recall data; and a second plurality of fields comprising unknown scores between pairs of user accounts and digital content items that have not been recalled by respective user-accounts of the digital content management system; and extrapolating scores for the second plurality of fields based on the known scores of the first plurality of fields.

7. The method of claim 6, wherein extrapolating the scores comprises:

factorizing the matrix to generate a Q-matrix and a P-matrix based on the known scores of the first plurality of fields; and determining, for each field of the second plurality of fields of the matrix, a dot product of corresponding rows and columns of the Q-matrix and the P-matrix.

8. The method of claim 6, further comprising determining the synchronization score based on the known scores of the first plurality of fields of the matrix and the extrapolated scores for the second plurality of fields of the matrix.

9. The method of claim 1, further comprising:

determining that the set of synchronization scores for the set of digital content items satisfy the synchronization criteria comprising one or more threshold synchronization scores.

10. The method of claim 1, further comprising:

identifying a second set of digital content items having synchronization scores that fail to satisfy the synchronization criteria comprising one or more threshold synchronization scores; and providing a recommendation to synchronize the second set of digital content items to the client device without automatically synchronizing the second set of digital content items to the client device.

11. A system comprising:

at least one processor; and at least one non-transitory computer readable storage medium storing instructions thereon that, when executed by the at least one processor, cause the system to:

identify a team comprising a user account and a set of additional user accounts having joint access to a shared collection of digital content items stored via a digital content management system;

collect user recall data associated with digital content items edited by the user account from the shared collection of digital content items, the user recall data comprising an indication of a number of times the user account edited a digital content item of the digital content items;

collect team recall data associated with additional digital content items edited by the set of additional user accounts from the shared collection of digital content items, the team recall data comprising an indication of a number of times the set of additional user accounts edited a digital content item of the additional digital content items;

determine a synchronization score for the user account with respect to each digital content item of the shared collection of digital content items based on an analysis of the digital content items edited by the user account and the additional digital content items edited by the set of additional user accounts according to the user recall data and the team recall data, wherein the synchronization score is associated with a prediction that the user account will locally synchronize a particular digital content item from the shared collection of digital content items; and based on determining that a set of synchronization scores for a set of digital content items satisfy synchronization criteria, automatically synchronize the set of digital content items to a client device.

12. The system of claim 11, further comprising instructions, that when executed by the at least one processor, cause the system to:

provide a synchronization recommendation by providing a selectable option for synchronizing one or more digital content items;

detect a selection of the selectable option; and in response to detecting the selection of the selectable option, synchronize the one or more digital content items by downloading one or more copies of the one or more digital content items from the shared collection of digital content items to a local storage of the client device.

13. The system of claim 11, wherein determining the synchronization score for the user account with respect to each digital content item of the shared collection of digital content items comprises:

constructing, from the user recall data and the team recall data, a content profile for a digital content item comprising file data for the digital content item and a history of interactions by the user account and the set of additional user accounts with respect to the digital content item;

comparing identifiers of the digital content items from the user recall data with identifiers of the additional digital content items from the team recall data to identify a subset of the additional user accounts having a similar recall history as the user account with respect to the shared collection of digital content items; and generating the synchronization score based on a comparison between the content profile for the digital content item and content profiles for the additional digital content items by the subset of the additional user accounts without considering content profiles for the additional digital content items for one or more accounts of the set of additional user accounts outside the subset of the additional user accounts.

14. The system of claim 11, wherein the instructions cause the system to:

generate a matrix representative of a recall history of user accounts of the digital content management system with respect to the shared collection of digital content items, the matrix comprising:

a first plurality of fields comprising known scores between pairs of user accounts of the digital content management system and digital content items that have been recalled by respective user accounts of the digital content management system in accordance with the user recall data and the team recall data; and a second plurality of fields comprising unknown scores between pairs of user accounts and digital content items that have not been recalled by respective user accounts of the digital content management system; and extrapolating scores for the second plurality of fields based on the known scores of the first plurality of fields, wherein extrapolating the scores comprises:

factorizing the matrix to generate a Q-matrix and a P-matrix based on the known scores of the first plurality of fields; and determining, for each field of the second plurality of fields of the matrix, a dot product of corresponding rows and columns of the Q-matrix and the P-matrix.

15. The system of claim 11, wherein the instructions cause the system to:

determine that the set of synchronization scores for the set of digital content items satisfy the synchronization criteria comprising one or more threshold synchronization scores.

16. A non-transitory computer-readable medium storing instructions thereon that, when executed by at least one processor, cause a computer system to:

identify a team comprising a user account and a set of additional user accounts having joint access to a shared collection of digital content items stored via a digital content management system;

collect user recall data associated with digital content items edited by the user account from the shared collection of digital content items, the user recall data comprising an indication of a number of times the user account edited a digital content item of the digital content items;

collect team recall data associated with additional digital content items edited by the set of additional user accounts from the shared collection of digital content items by the set of additional user accounts, the team recall data comprising an indication of a number of times the set of additional user accounts edited a digital content item of the additional digital content items;

determine a synchronization score for the user account with respect to each digital content item of the shared collection of digital content items based on an analysis of the digital content items edited by the user account and the additional digital content items edited by the set of additional user accounts according to the user recall data and the team recall data, wherein the synchronization score is associated with a prediction that the user account will locally synchronize a particular digital content item from the shared collection of digital content items; and based on determining that a set of synchronization scores for a set of digital content items satisfy synchronization criteria, automatically synchronizing the set of digital content items to a client device.

17. The non-transitory computer readable medium of claim 16, further comprising instructions, that when executed by the at least one processor, cause the computer system to:

provide a synchronization recommendation by providing a selectable option for synchronizing one or more digital content items;

detect a selection of the selectable option; and in response to detecting the selection of the selectable option, synchronize the one or more digital content items by downloading one or more copies of the one or more digital content items from the shared collection of digital content items to a local storage of the client device.

18. The non-transitory computer readable medium of claim 16, wherein determining the synchronization score for the user account with respect to each digital content item of the shared collection of digital content items comprises:
- constructing, from the user recall data and the team recall data, a content profile for a digital content item comprising file data for the digital content item and a history of interactions by the user account and the set of additional user accounts with respect to the digital content item;
- comparing identifiers of the digital content items from the user recall data with identifiers of the additional digital content items from the team recall data to identify a subset of the additional user accounts having a similar recall history as the user account with respect to the shared collection of digital content items; and
- generating the synchronization score based on a comparison between the content profile for the digital content item and content profiles for the additional digital content items by the subset of the additional user accounts without considering content profiles for the additional digital content items for one or more accounts of the set of additional user accounts outside the subset of the additional user accounts.

19. The non-transitory computer readable medium of claim 16, further comprising instructions that, when executed by the at least one processor, cause the computer system to:
- generate a matrix representative of a recall history of user accounts of the digital content management system with respect to the shared collection of digital content items, the matrix comprising:
  - a first plurality of fields comprising known scores between pairs of user accounts of the digital content management system and digital content items that have been recalled by respective user accounts of the digital content management system in accordance with the user recall data and the team recall data; and
  - a second plurality of fields comprising unknown scores between pairs of user accounts and digital content items that have not been recalled by respective user accounts of the digital content management system; and
- extrapolating scores for the second plurality of fields based on the known scores of the first plurality of fields, wherein extrapolating the scores comprises:
  - factorizing the matrix to generate a Q-matrix and a P-matrix based on the known scores of the first plurality of fields; and
  - determining, for each field of the second plurality of fields of the matrix, a dot product of corresponding rows and columns of the Q-matrix and the P-matrix.

20. The non-transitory computer readable medium of claim 16, further comprising instructions that, when executed by the at least one processor, cause the computer system to:
- determine that the set of synchronization scores for the set of digital content items satisfy the synchronization criteria comprising one or more threshold synchronization scores.

* * * * *